US011526290B2

(12) United States Patent
Koufaty et al.

(10) Patent No.: US 11,526,290 B2
(45) Date of Patent: Dec. 13, 2022

(54) SYSTEM AND METHOD TO TRACK PHYSICAL ADDRESS ACCESSES BY A CPU OR DEVICE

(71) Applicant: Intel Corporation, Santa Clara, CA (US)

(72) Inventors: David Koufaty, Portland, OR (US); Rajesh Sankaran, Portland, OR (US); Rupin Vakharwala, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 73 days.

(21) Appl. No.: 16/458,013

(22) Filed: Jun. 29, 2019

(65) Prior Publication Data

US 2020/0409585 A1 Dec. 31, 2020

(51) Int. Cl.
*G06F 3/06* (2006.01)
*G06F 12/0882* (2016.01)
*G06F 12/1009* (2016.01)

(52) U.S. Cl.
CPC .......... *G06F 3/0647* (2013.01); *G06F 3/0607* (2013.01); *G06F 3/0685* (2013.01); *G06F 12/0882* (2013.01); *G06F 12/1009* (2013.01)

(58) Field of Classification Search
CPC .... G06F 3/0647; G06F 3/0607; G06F 3/0685; G06F 12/0882; G06F 12/1009
See application file for complete search history.

(56) References Cited

U.S. PATENT DOCUMENTS 6,453,408 B1 * 9/2002 Stuart Fiske ........... G06F 12/08
709/216
6,499,028 B1 * 12/2002 Brock ................. G06F 11/3409
707/4

(Continued)

FOREIGN PATENT DOCUMENTS

WO WO-2018058363 A1 * 4/2018 ............ G06F 3/0611

OTHER PUBLICATIONS

Intel; "Paging (Virtual Memory) Overview;" Jun. 23, 2011; Intel; available at: https://web.archive.org/web/20110623172435/http://www.cs.albany.edu/~sdc/CSI500/Spr10/Classes/C15/intelpaging83-94.pdf (Year: 2011).*

(Continued)

*Primary Examiner* — Kalpit Parikh
(74) *Attorney, Agent, or Firm* — Nicholson De Vos Webster & Elliott LLP

(57) ABSTRACT

A system for tracking memory access patterns to be used in making data placement and migration policies. The system includes a processing unit and a system memory. The system memory includes a local memory and a remote memory, each of which having mapped thereon, a plurality of memory pages. Each of the plurality of memory pages corresponds to one or more physical addresses. A set of attributes for each memory page is stored in a physical attribute table (PAT). The PAT is looked up and the attributes updated when a memory access is detected. Attributes stored in the PAT are used to control the movement of memory pages between the local memory and the remote memory. When the attributes in the PAT indicate a remote memory page is being accessed frequently by the processing unit, the remote memory page is moved from the remote memory to the local memory.

18 Claims, 19 Drawing Sheets

(56) References Cited

U.S. PATENT DOCUMENTS

| | | | | |
|---|---|---|---|---|
| 6,766,424 | B1* | 7/2004 | Wilson | G06F 12/0813 |
| | | | | 711/148 |
| 7,805,588 | B2* | 9/2010 | Bridges | G06F 12/1063 |
| | | | | 711/207 |
| 2011/0072234 | A1* | 3/2011 | Chinya | G06F 12/121 |
| | | | | 711/E12.001 |
| 2011/0107042 | A1* | 5/2011 | Herron | G06F 3/068 |
| | | | | 711/161 |
| 2011/0247000 | A1* | 10/2011 | Eidus | G06F 9/50 |
| | | | | 718/104 |
| 2012/0272029 | A1* | 10/2012 | Zhang | G06F 12/0284 |
| | | | | 711/165 |
| 2014/0108759 | A1* | 4/2014 | Iwamitsu | G06F 3/0647 |
| | | | | 711/165 |
| 2014/0281110 | A1* | 9/2014 | Duluk, Jr. | G06F 12/123 |
| | | | | 710/313 |
| 2015/0052287 | A1* | 2/2015 | Venkatasubramanian | |
| | | | | G06F 9/5083 |
| | | | | 711/6 |
| 2015/0052327 | A1* | 2/2015 | Ancajas | G06F 3/0647 |
| | | | | 711/165 |
| 2015/0278121 | A1* | 10/2015 | Gschwind | G06F 9/3834 |
| | | | | 711/125 |
| 2016/0231933 | A1* | 8/2016 | Loh | G06F 3/0653 |
| 2017/0185514 | A1* | 6/2017 | Blinzer | H04L 67/28 |
| 2017/0228322 | A1* | 8/2017 | Chang | G06F 3/061 |
| 2018/0088832 | A1* | 3/2018 | Li | G06F 3/0611 |
| 2019/0188149 | A1* | 6/2019 | Abhishek Raja | G06F 12/109 |

OTHER PUBLICATIONS

Lepers, Baptiste; "Improving performance on NUMA systems;" Jun. 28, 2017; HAL Archives-Ouvertes; at least pp. 10-22 and 27-43; available at: https://tel.archives-ouvertes.fr/tel-01549294/document (Year: 2017).*

Yao, Jin; "A tool for memory access locality characterization and analysis;" Mar. 31, 2014; NUMATOP; available at: https://web.arcnive.org/web/20140331210349/https://01.org/sites/default/files/documentation/numatop_introduction_0.pdf (Year: 2014).*

Kaminski, Patruk; "NUMA aware heap memory manager;" Aug. 30, 2017; available at: https://web.archive.org/web/20170830044756/https://developer.amd.com/wordpress/media/2012/10/NUMA_aware_heap_memory_manager_article_final.pdf (Year: 2017).*

Amit, Nadav. "Optimizing the {TLB} Shootdown Algorithm with Page Access Tracking." 2017 USENIX Annual Technical Conference (USENIX ATC 17). 2017. (Year: 2017).*

European Search Report and Search Opinion, EP App. No. 20163133.0, dated Sep. 25, 2020, 6 pages.

* cited by examiner

SYSTEM AND METHOD TO TRACK PHYSICAL ADDRESS ACCESSES BY A CPU OR DEVICE

TECHNICAL FIELD

Embodiments of the invention described herein relate generally to the efficient utilization of memory in a computer processing system. In particular, the disclosure relates to processor architecture extension to track memory accesses.

BACKGROUND ART

In a non-uniform memory access (NUMA) system, accessing different memory locations incur different costs. The costs are typically dependent on the proximity between the memory location being accessed and the central processing unit (CPU) or device accessing it. For instance, in a multi-socket system, accessing a memory location from a CPU within the same socket is significantly faster than accessing the memory location in a different socket. Similarly, in a host-device system, accessing a memory location from a device to a device-attached memory is much faster than accessing the host memory. Thus, by strategically moving and storing data in memory locations closer to the CPU or the device accessing the data, the cost of access decreases. Current processor architectures, however, lack the ability to provide dynamic memory access information to software (e.g., the operating system) and/or hardware (e.g., CPU) to enable them to make optimal decisions on the placement and/or the movement of data in memory.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
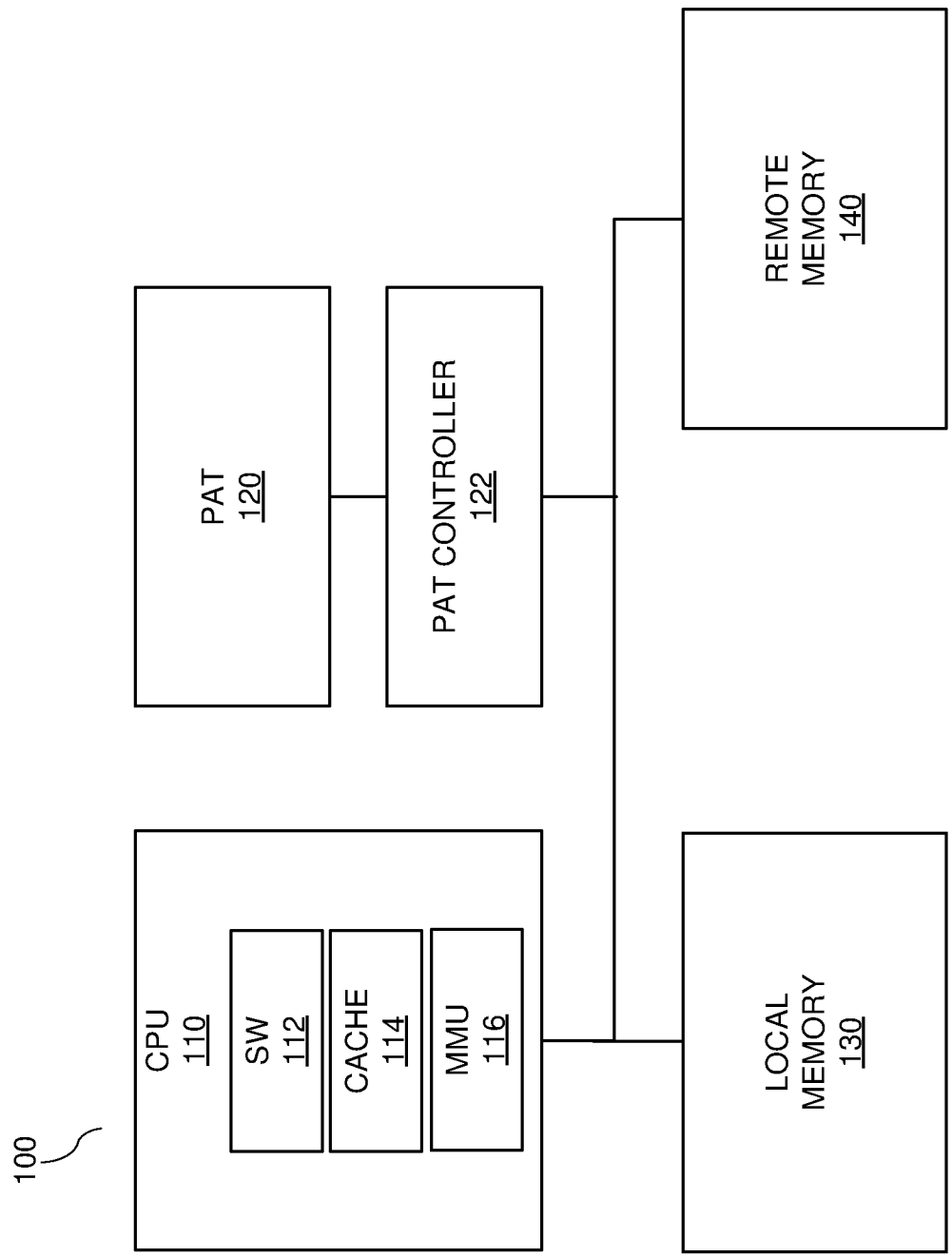
FIG. 1 illustrates a system embodiment on which various aspects of the present disclosure may be implemented.

Embodiments of system and method for implementing a mechanism to track memory accesses for optimized data placement and migration are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Memory access requests from central processing units (CPU) or attached devices (e.g., graphic processing units (GPUs), field programmable gate array (FPGAs), accelerators, etc.) contain virtual/logical memory addresses (virtual addresses) that must be translated into physical memory addresses (physical addresses) before they are sent to the memory subsystem to be processed. The term "physical address" used herein and throughout this disclosure refers to the final physical address after all address translations are complete. The final physical address may also be known as the host physical address or system physical address. It is different from the guest physical addresses within a guest operating system of a virtualized environment. In order to access memory, a guest physical address still needs to be translated into a final physical address.

For CPUs, address translation is performed by the memory management unit (MMU). For devices, this task is handled by the input/output memory management unit (IOMMU) of the device. A set of page tables is typically used by the MMU or the IOMMU to translate virtual addresses to physical addresses. In a virtualized environment, multiple sets of page tables may be used. A first set of page tables to translate guest virtual addresses to guest physical addresses. A second set of page tables is then used to translate guest physical address to host physical address. In most cases, once a virtual address is translated, the virtual-to-physical address mapping for that virtual address is stored in address translation caches (e.g., temporary lookaside buffers (TLB)) for quick reference in subsequent translations.

The physical address access pattern has significant performance impact in a system. In a NUMA system with multiple sockets, accessing a local memory from a CPU in the same socket is significantly faster than accessing a memory in a remote socket. Similarly, in a host-device system where a device has its own device-attached memory, accessing a memory location from the device to the device-attached memory is faster than accessing the host memory in the host. Current computer/processor platforms lack the mechanism to inform the appropriate software (e.g., the operating system) and/or hardware (e.g., CPU or its components) about the dynamic physical address access patterns of an application, which are useful in making and enforcing physical memory placement and migration policies.

Currently, data placement and migration in a NUMA system are guided by software hints. For example, software may track memory accesses based on page table manipulation, such as by statistically unmapping page table entries or use access bits to gain access patterns details. In a host-device system, data migration to and from the device-attached memory is typically guided by expensive mapping and unmapping operations that guarantee a page is only mapped either in the host (e.g., CPU) or in the device. This migration to and from device-attached memory is performed by default on every access. Further hardware support allows the device to track access counts physical address inside the device. Counting mechanisms based on page table manipulations (unmapping, access bits) are very expensive and not very accurate. Counting accesses inside the device requires additional hardware support on each device, which are not only expensive but are sometime not feasible.

In addition to performing the virtual-to-physical address translations, the MMU and the IOMMU also ensures that the requesting CPU or device, respectively, has the proper permissions to access the requested physical addresses as part of the address translation. However, device accesses using the address translation service (ATS) of the peripheral component interconnect express (PCIe) that are the result of a device's TLB hit, referred as a translated request, are performed in the physical address domain and are not subject to any permission checks by the IOMMU. While this ATS design leads to improved device performance, it suffers a significant security gap in which a malicious device can access various locations of the system memory using bogus physical addresses and thereby circumventing all memory protections set forth by the IOMMU.

Currently, the only solution to preventing the security gap present in the ATS mechanism is to disable it. This solution not only incurs significant performance loss on devices that rely heavily on the ATS and the device TLB, disabling ATS also prevents devices from supporting shared virtual memory (SVM) because the device page faulting capability is an integral part of ATS. Thus, disabling ATS suffers a significant performance tradeoff.

To address the aforementioned issues, an aspect of this disclosure is directed to a new mechanism for implementing and maintaining attributes (i.e. metadata) for physical addresses in a physical address space. According to an embodiment, the physical memory is divided into variable-size physical pages, each physical page associated with its own set of attributes. The attributes may be maintained by software, hardware, or a combination thereof. According to an embodiment, the attributes are used to drive data movement and/or migration policies as well as access permission. The attributes may also be used to guide software optimizations.

In one embodiment, attributes are maintained by hardware for each physical page. These attributes are then used by software and/or hardware, for example, to optimize the performance of NUMA systems through scrubbing dirty pages, migrating data between local and remote memory locations, etc. According to an embodiment, various hardware may use the attributes to limit translated memory accesses (i.e. translated requests), which resulted from the utilization of PCIe's ATS by a device, to a well-defined set of physical addresses (e.g. those that are the result of a translation request) to prevent unauthorized accesses.

According to an embodiment, a new mapping structure, Physical Attribute Table (PAT) is used to store and track the attributes for different physical addresses in a physical address space. Each entry in the PAT corresponds to a memory page in physical memory and stores a set of attributes for the corresponding memory page. Since each memory page may cover one or more physical addresses, each PAT entry thus may correspond to one or more physical addresses. Every physical address within the memory page share the same set of attributes as the memory page. Examples of the attributes include:

Read permission attribute—A one-bit field (R-bit) to indicate whether data stored at a physical address may be read. For example, a set R-bit indicates that the data stored at the physical address may be read by a requestor.

Write permission attribute—A one-bit field (W-bit) to indicate whether the memory location corresponding to the physical address may be modified. For example, a set bit indicates that the location may be modified by a requestor.

Access Count attribute—An N-bit field used to track accesses to the corresponding physical address. For example, each time an access (read or write) to a physical address is detected, the access count attribute in the PAT entry corresponding to the access physical address is incremented.

Dirty bit attribute—A one-bit field (D-bit) to indicate whether the memory location corresponding to the physical address has been modified. For example, when a write access to the physical address is detected, the D-bit is set to indicate that the physical address has been modified.

Count Control attribute—A one-bit field (C-bit) to indicate whether the access count attribute should be maintained for the corresponding physical address. For example, the access count attribute is not used to track memory accesses if the C-bit is not set.

Source Control attribute—A bit field (S-bit) to control whether the access count attribute should be incremented for accesses made only by the CPU, only by the device, or both.

Interrupt Control attribute—A one-bit field (I-bit) to indicate whether an interrupt or exception should be generated when the access count attribute exceeds a configurable threshold, or when there is an overflow. The specific interrupt or exception to be generated, as well as the target to which they will be sent and the threshold, may be configured by control registers.

It will be appreciated that any number of the attribute fields described above may be implemented in the PAT. Each attribute field may be implemented using more or less bits than described above. The meaning of the attribute fields may vary depending on the implementation and usage. The PAT may also include other attribute fields not specifically described in this disclosure.

PAT may be organized and implemented in any number of ways, each offering different trade-offs between cost, performance, and flexibility. For example, the PAT may be implemented as a flat table for simplicity. Alternatively, a hierarchical structure comprising multiple tables may be used to save storage space. According to an embodiment, the PAT may be implemented similar to hierarchical page tables. Such implementation enables to the PAT to associate a set of attributes with a physical memory page which includes multiple physical addresses. When organized at a page-granularity, all physical addresses within the same memory page share the same attributes.

Attributes in the PAT may be updated by hardware, software, or a combination thereof depending on the desired usage. In one embodiment, software (e.g., operating system) initializes all attributes to default values and sets the control attributes to define the PAT operation. Thereafter, as memory accesses are detected, hardware (e.g., a PAT controller) in the system updates the attributes in the PAT based on the accessed physical addresses and thereby tracks dynamically the system's memory access behavior. The PAT may be stored in a shared storage, such as the memory. Alternatively, or in addition to, the PAT may be stored in its own dedicated storage.

According to an embodiment, a PAT is stored in system memory and the location of the PAT in memory is identified by a register containing the root memory address of the PAT. How the PAT may be configured for each logical processor depends on the usage. For example, the PAT may be configured uniquely for each logical processor such that each logical processor is associated with a respective PAT. Each of the PATs is identified by a different root memory address. In this usage case, each PAT tracks per-processor attributes. Alternatively, a single PAT may be configured for all logical processor with the same socket, such that every logical processor within the socket is associated with the same PAT identified by the same root memory address. In this usage case, the PAT tracks per-socket attributes. The PAT may also be configured identically on all logical processors irrespective of the socket to track global or system-wide attributes.

According to another embodiment, in a device usage case, the PAT is identified by one or more register and/or memory-based control structures in the fabrics connecting the device and memory. For a non-coherent link such as PCIe, such logic can exist in the address translation logic (e.g. an IOMMU).

FIG. 1 is a block diagram illustrating a system embodiment on which various aspects of the present disclosure may be implemented. System 100 includes CPU 110, PAT 120, PAT controller 122, local memory 130, and remote memory 140. The CPU 110 may additionally include software 112, cache 114, and MMU 116. The software 112 may be program codes or instructions executed on the CPU 110. The software 112 may be an operating system or a kernel of the OS. The cache 114 may be a hierarchical cache comprising multiple levels (e.g., level 1, level 2, and/or lase level cache). While only one CPU is illustrated, system 100 may include other CPUs, each including more or less components than CPU 100. The MMU 116 translates virtual or logical addresses into physical addresses. The MMU 116 may include one or more TLBs (not shown) to store recently used address translations.

As noted above, the PAT 120 may be stored in the local memory 130 and/or the remote memory 140. Alternatively, or in addition to, the PAT 120 may be stored in a separate storage unit (e.g., a register or data store) different from memories 130 and 140. Moreover, entries of the PAT may be cached in the CPU 110, such as in cache 114, a separate dedicated cache (e.g., PAT cache), the MMU 116, etc. According to an embodiment, the cached PAT entries are accessible (e.g., read and/or write) by the PAT controller.

The PAT controller maybe implemented by hardware (e.g., circuitry), software (e.g., program code), or a combination thereof. The PAT controller 122 may be implemented as separately or as part of CPU 110, such as in the MMU 116. In some embodiments, the PAT controller 122 is software executed on the CPU 110. As detailed below, the PAT controller 122 controls and performs operations relating the PAT 120 which includes, but are not limited to, updating the attributes stored in the PAT entries, generating interrupts or exceptions based on attribute values and/or thresholds, responding to inquiries to the PAT, initializing and/or resetting PAT entries and attribute values, etc.

The local memory 130 and remote memory 140 each stores one or more memory pages. These memory pages are accessed based on physical addresses. The CPU 110 may access memory pages in the local memory 130 as well as the memory pages in the remote memory 140. The CPU 110, local memory 130, and the remote memory 140 may be implemented in the same socket or in different sockets. For example, in some embodiments, the CPU 110 and the local memory 130 are located in the same socket while the remote memory is located another socket. In other embodiments, the CPU 110, local memory 130, and the remote memory 140 are all in the same socket. Regardless of where the memories are located in relation to the CPU or to each other, it should be noted it is generally cheaper for the CPU 110 to access the local memory 130 than the remote memory 140.

Figure 2:
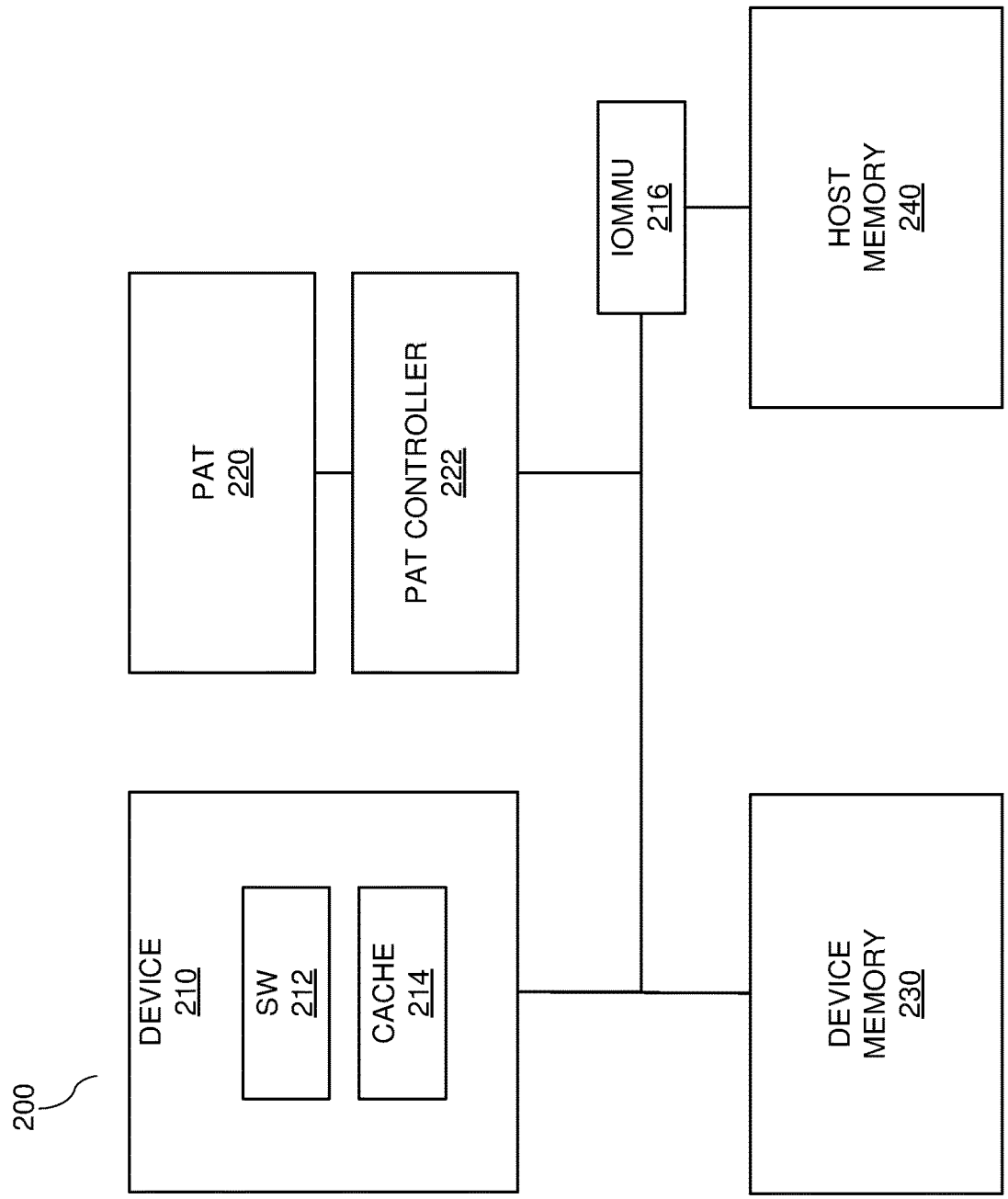
FIG. 2 illustrates another system embodiment on which various aspects of the present disclosure may be implemented.

FIG. 2 is a block diagram illustrating another system embodiment on which various aspects of the present disclosure may be implemented. Host-device system 200 includes device 210, PAT 220, PAT controller 222, device memory 230, IOMMU 216 and host memory 240. System 200 may additionally include a root complex (not shown). In some embodiments, the IOMMU 216 may be implemented as part of the root complex. The device 210 may include device software 212 and cache 214. Device software 212 may be program codes or instructions executed on the device 210. The cache 114 temporarily stores data received from the device memory 230 or host memory 240 that are to be executed by the execution units of device 210. While only one device is illustrated, system 200 may include other devices. Examples of the device include GPU, FPGA, accelerators, network cards, etc.

The PAT 220 may be stored in the device memory 230 and/or the host memory 240. Alternatively, or in addition to, the PAT 220 may be stored in a separate storage unit. Moreover, entries of the PAT may be cached in the device 210, such as in cache 214, a different cache (not shown), or the IOMMU 216.

The PAT controller 222 may be implemented by hardware (e.g., circuitry), software (e.g., program code), or a combination of both. The PAT controller 222 may be implemented separately or as part of the device 210, such as within the IOMMU 216. In some embodiments, the PAT controller 222 is software executed on the device 210. The PAT controller 222 controls and performs operations relating to the PAT 220 similar to those performed by the PAT controller 122 described above.

The device memory 230 and host memory 240 each stores one or more memory pages. These memory pages are accessed based on physical addresses, which are translated from virtual or guess addresses by the IOMMU 216. The device 210 may access memory pages in the device memory 230 as well as those in the host memory 240. Access to the device memory 230 by the device 210 is generally cheaper than accesses to the host memory 240.

Figure 3A:
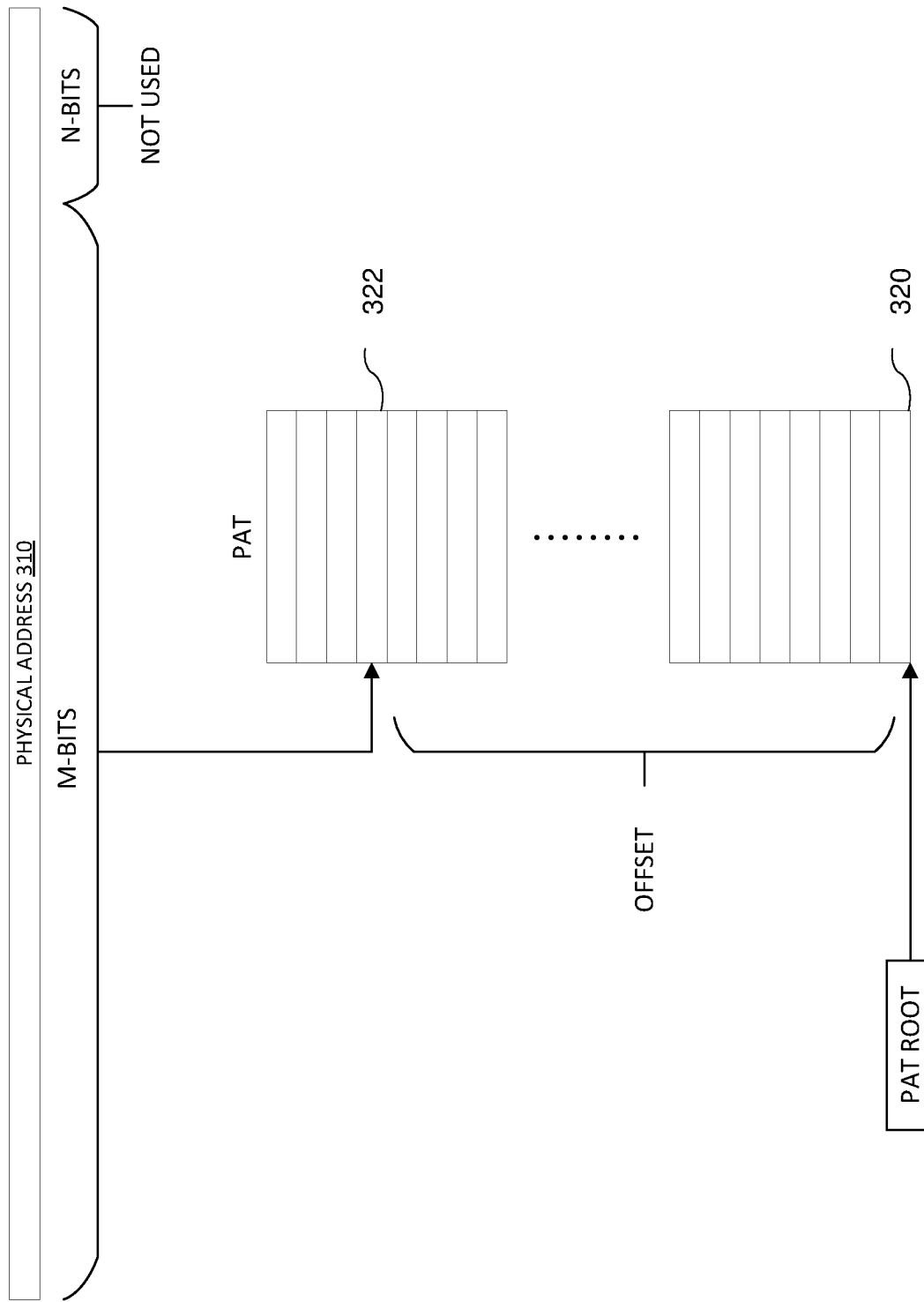
FIG. 3A is block diagrams illustrating a physical attribute table (PAT) organized as a flat table according to an embodiment.

FIG. 3A is a block diagram illustrating a PAT organized as a flat table according to an embodiment. The PAT root 312 is an address or a pointer that identifies the location 320 of where the PAT is stored. For example, the PAT may be stored in memory and the PAT root 312 identifies the memory location 320 that stores the head of the PAT. The PAT root 312 itself may be stored in a register of the CPU, IOMMU, or device. It may also be stored in the memory. To locate a PAT entry for a particular physical address 310, M-bits of the physical address 310 are used as an offset into the memory location 320, which is identified by the PAT root 312. The number of M-bits to use depends on the desired size of the PAT. In one embodiment, where each memory page is of $2^N$ KB in size, the least significant N-bits are not used because the physical addresses in that range all belong to the same memory page and thus share the same attributes. As such, only one PAT entry is needed for each memory page.

Figure 3B:
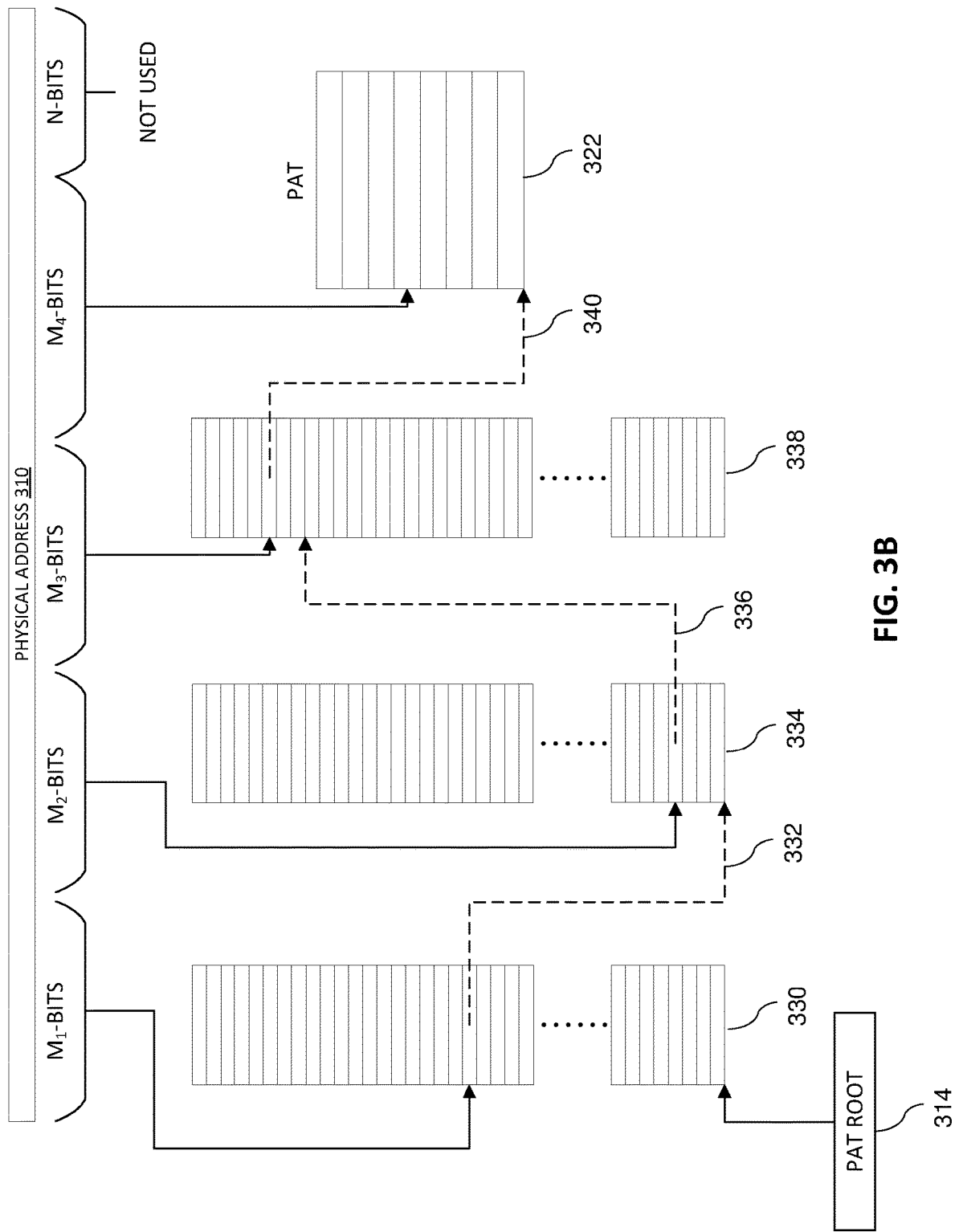
FIG. 3B is block diagrams illustrating a PAT organized as a hierarchical table according to an embodiment.

FIG. 3B is a block diagram illustrating a PAT organized as a hierarchical table according to another embodiment. The PAT root 314 identifies the location of a first level table 330. A first portion ($M_1$-bits) of the physical address 310 is used as an offset to identify an entry in first level table, which stores a pointer 332 to location of the second level table 334. A second portion ($M_2$-bits) of the physical address 310 is then used as an offset to identify an entry in the second level table that stores a pointer 336 to a third level table 338. Next, a third portion ($M_3$-bits) of the physical address 310 is used as an offset into the third level table 338 to identify an entry in the third level table. The pointer 340 stored in that entry is then used to identify the location of the PAT 322. Finally, a fourth portion ($M_4$-bits) of the physical address 310 identifies the PAT entry that stores the attributes for physical address 310. FIGS. 3A and 3B are just some examples of how the PAT may be implemented. Other organizations may be used to support different size attributes or physical memory regions based on the desired usage.

Figure 4:
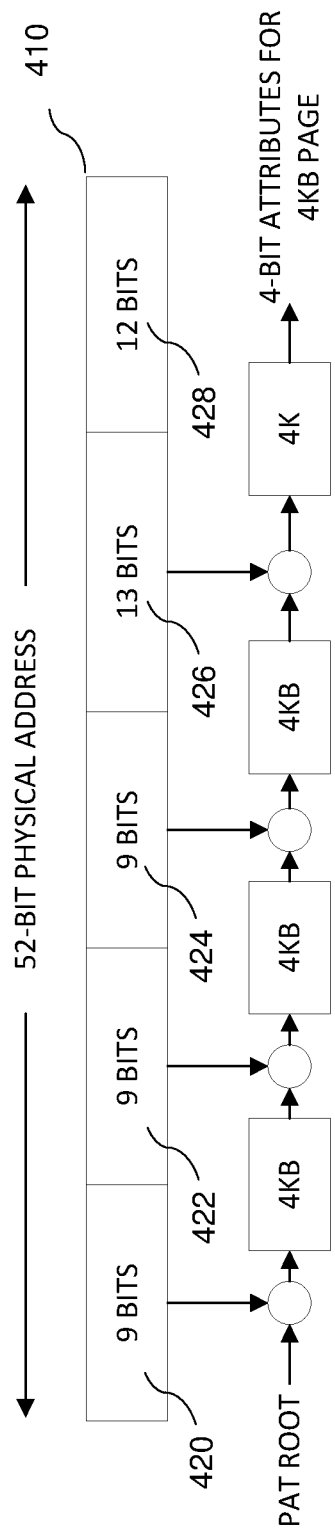
FIG. 4 illustrates a logical mapping of a physical address space onto a hierarchical PAT in accordance to an embodiment.

FIG. 4 illustrates a logical mapping of a physical address space onto a hierarchical PAT according to an embodiment. As illustrated, the PAT is organized to map a 52-bit physical address space into attributes associated with a 4 KB physical region of memory (memory page) and return a 4-bit attribute. The physical address 410 is 52-bits wide. Each of the first three most significant 9-bit portions 420, 422, and 424 is used to index into a first, second, and third level table, respectively. The next 13-bits 426 is used to index into the PAT to find an entry corresponding to the physical address 410. The entry includes 4 attribute bits (e.g., 1 bit for each of the attributes Read, Write, Dirty, and an unused bit). The last 12 bits 428 of the physical address are not used because the physical addresses in that range shares the same attributes. It should be appreciated that other organizations may be used if more, or less, bits are allocated to each attribute, or if support for larger physical regions of memory (e.g. 2 MB) is desired.

Figure 5:
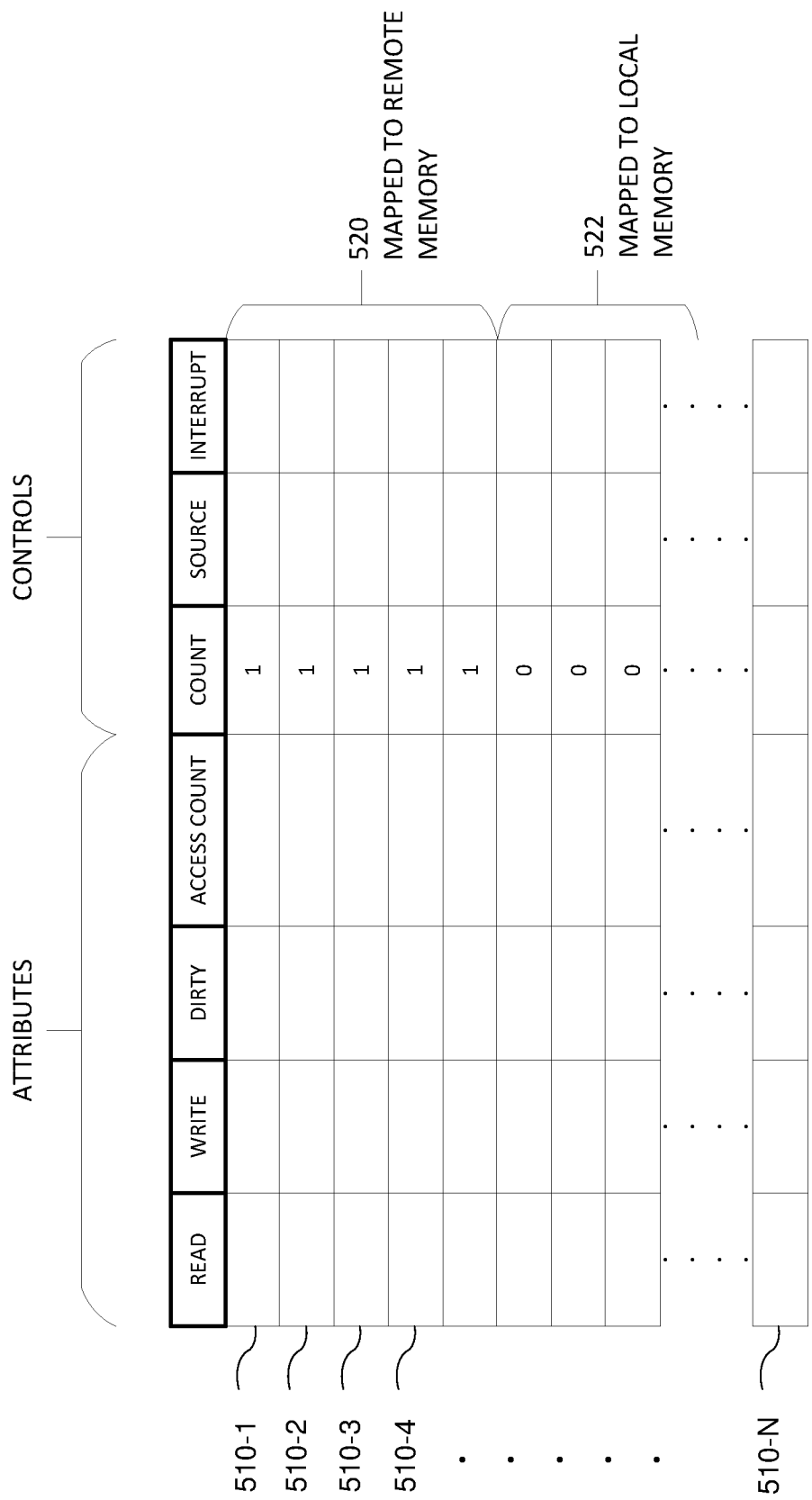
FIG. 5 is a logical representation of an embodiment of the PAT.

FIG. 5 is a logical representation of a physical attribute table according to an embodiment. Table 5 comprises a plurality of entries 510, each of which corresponds to a memory page and stores a set of attributes for that memory page. Each memory page may include one or more physical addresses and every physical address in a memory page shares the same set of attributes as the memory page. Each attribute set may include one or more attributes, such as the read, write, dirty, and/or access count attributes described above. Moreover, according to some embodiments, each entry additionally includes one or more control attributes such as the count, source, and/or interrupt attributes. The control attributes may be used to control the specific operations of the PAT with respect to the access tracking of individual memory pages. For example, to track only the accesses to remote memory pages, the count attribute for all entries 520 that correspond to memory pages stored in the remote memory are set to 1. In contrast, entries 522 that correspond to memory pages stored in the local memory is set to 0. Furthermore, the tracking behavior may further be fine-tuned using the source control attribute to limit the tracking to only accesses made the CPU, or to only accesses made by the device. In one embodiment, the count control attribute and the source control attribute may be combined as a 2-bit attribute. For example, a bit value of 00 may indicate that any accesses made to the memory page are not counted irrespective of the source; a bit value of 01 may indicate that only the accesses from the CPU are counted; a bit value of 10 may indicate that only the accesses by the device are counted; and a bit value of 11 indicates that any access made by the CPU or the device are counted.

Figure 6:
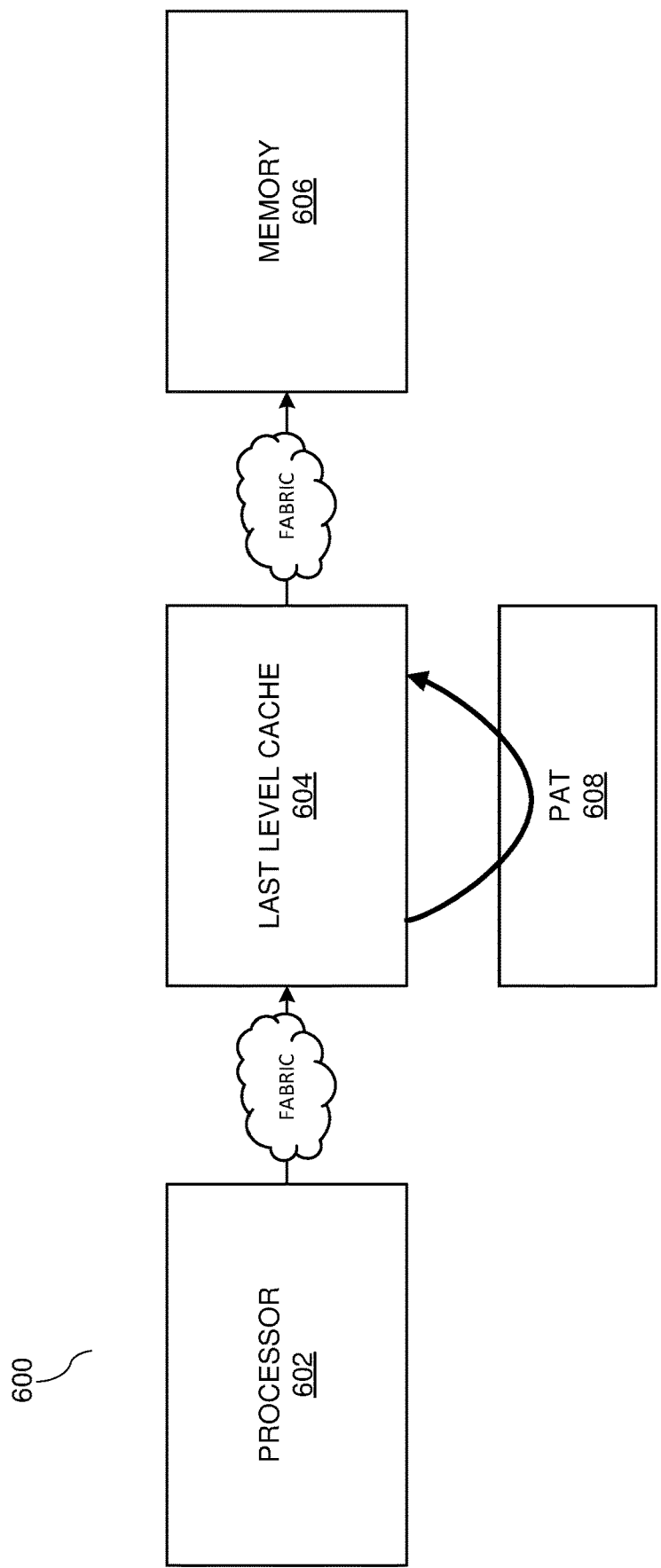
FIG. 6 is a block diagram illustrating a CPU's usage of the PAT to optimize NUMA migrations according to an embodiment.

As noted above, the attributes tracked by the PAT may be used to improve the performance of certain common software optimizations. For these usages, when a CPU makes a request to memory, the PAT controller detects the request, looks up the corresponding entry in the PAT, and updates the entry when necessary. This lookup may be optimized using a PAT cache. FIG. 6 is a block diagram illustrating the CPU's usage of the PAT to optimize NUMA migrations.

For NUMA optimizations, the PAT 608 may contain a saturating Access Count attribute for each memory page. When a CPU (processor) 602 makes a memory access, the Access Count in the PAT entry that corresponds to the memory page is incremented. If the count attribute is supported, then the Access Count attribute is only incremented if the count attribute is set. In one embodiment the access count is updated on each memory access. This may be optimized by updating the access count when a memory request misses the CPU cache(s) (e.g., last level cache 604) and needs to access the memory 606. In this case, updates will occur outside of the CPU, such as in the coherent fabric at a caching agent. A global PAT root configured by software may be used. Since the PAT resides in memory, this option allows caching of the PAT in the same caching agent. As noted above, the PAT may be optimized by software, such as by setting the count control attribute, so that the access count attribute is only incremented for requests that access the physical addresses mapped to remote sockets. In addition, software may set the same PAT root for every CPU in a socket to obtain the access counts for the whole socket. Software can periodically inspect the entries in the PAT to find memory pages that reside in a remote socket but are being frequently accessed from a given socket and migrate these memory page accordingly. It will be appreciated that some or all of the functions and operations disclosed herein may be performed by hardware (e.g., CPU or dedicated modules or circuitries) instead of the software.

Figure 7:
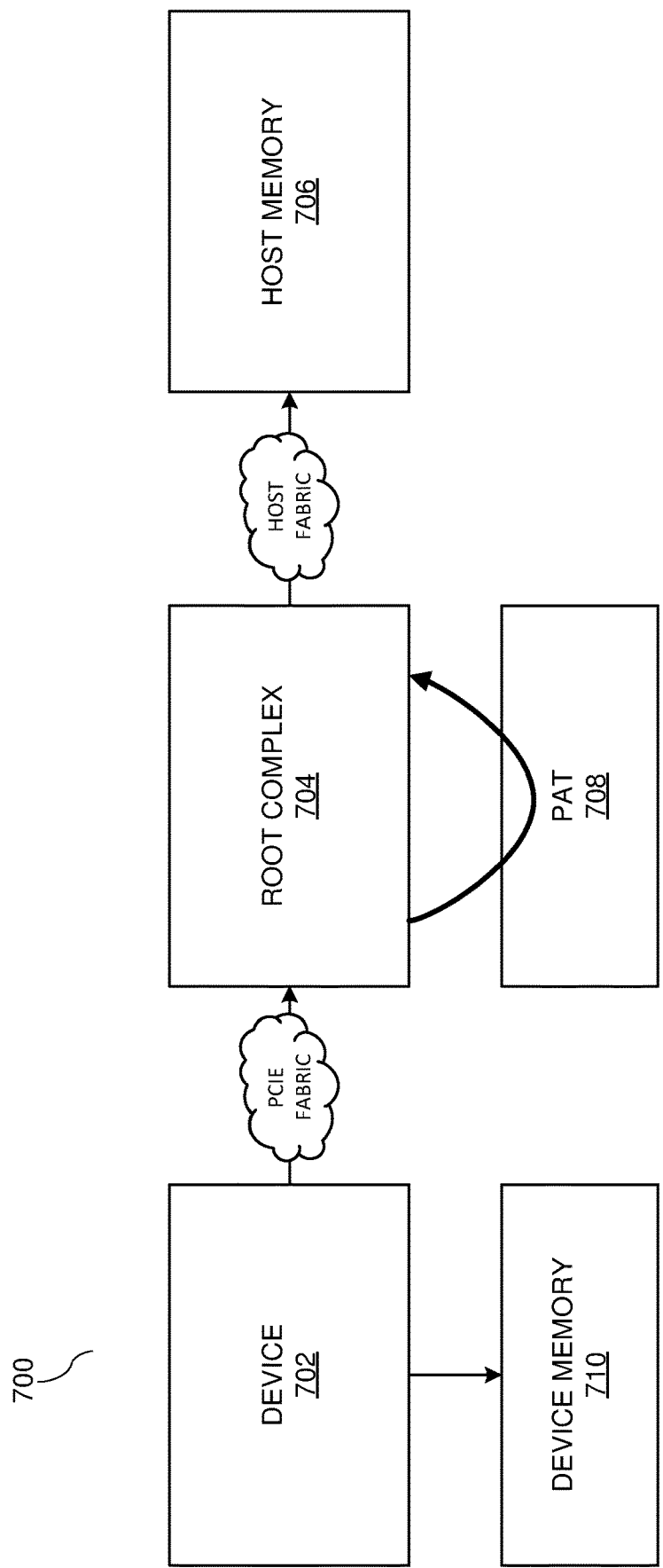
FIG. 7 is a block diagram illustrating the device usage of the PAT to optimize data migrations according to an embodiment.

An approach similar to the NUMA optimization may be used to dynamically migrate data between the host and device-attached memory. Such optimizations typically have very good performance gains because accesses by a device to a device-attached memory have much lower latency and higher bandwidth than accesses by the device to a host memory. FIG. 7 is a block diagram illustrating the device usage of the PAT to optimize data migrations according to an embodiment. The PAT 708 may be configured to update the access count only for device accesses to host memory. Specifically, for any PAT entries that are mapped to memory pages in the host memory 706, their count control attribute is set so that any accesses made to these memory pages will be tracked and counted by the PAT 708. In addition, the source control attributes of these entries are set to count only the accesses made by the device 702. Thus, when the device 702 makes a request to the host memory 706, the PAT 708 is updated along the path of the device attach point to host memory. According to an embodiment, the PAT controller, which may be implemented in the Root Complex 704, may include a PAT cache to improve the performance of the PAT lookup. Software executed on the CPU or the device, as well as hardware of the CPU or the device, can periodically inspect the PAT entries to find host memory pages that are being frequently accessed by the device and migrate those memory pages to the device memory 710 accordingly.

Additionally, in some embodiments, the PAT 708 may restrict device accesses to a pre-defined set of physical addresses. As previously explained, ATS allows device to cache address translations and make translated requests that are not subject to any permission checks. To close this gap, system software may pre-configure the PAT to allow translated requests to access only the physical addresses that are mapped to the same domain as the device (e.g., memory pages that can be accessed from the device 702), by setting the read and write permission attributes accordingly.

When a device makes a translated request, the corresponding PAT entry is looked up and the read and/or write permission attributes in that entry are used to decide if the access should be permitted. If the device has no permission to access the requested physical address, the device access may be blocked or redirected to a safe address (e.g. an abort page where reads return a fixed value and writes are dropped). Moreover, an interrupt or exception message may be generated. The root complex 704 may also log the error for further action.

Figure 8:
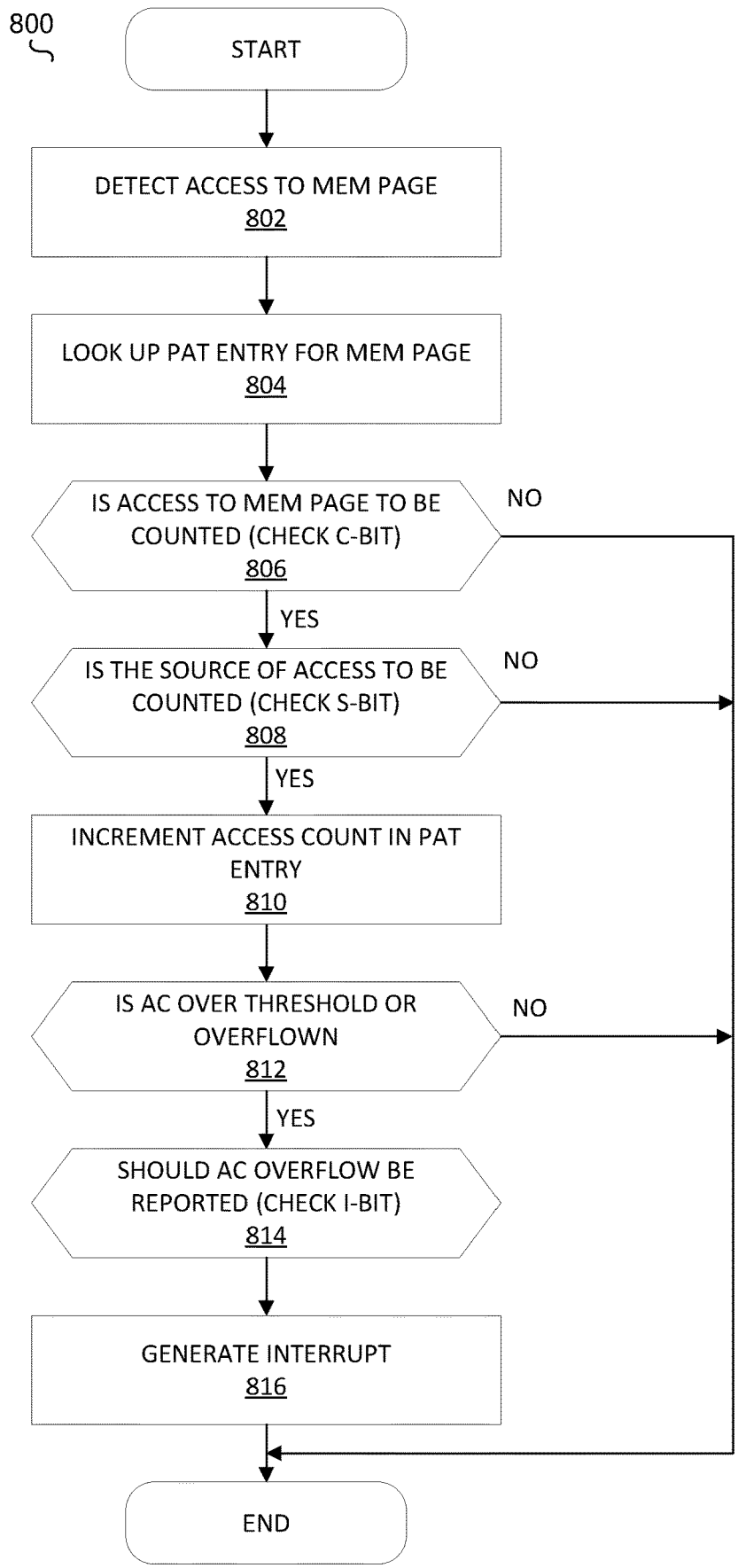
FIG. 8 is a flow diagram illustrating a method for updating the access count attributes in a PAT entry according to an embodiment.

FIG. 8 is a flow diagram that illustrates a method for updating the access count attributes in a PAT entry according to an embodiment. Method 800 may be implemented in any of the systems described in this disclosure. Specifically, method 800 may be performed by the PAT controllers 122 and 222 shown in FIGS. 1 and 2.

Method 800 begins at the start block and moves to block 802. At block 802, a request to access a memory page in memory is detected by a PAT controller. The PAT controller may monitor the connection between the CPU/device and the memory for memory requests. The request may contain one or more physical addresses to identify a requested memory page. At block 804, the physical address in the request is used to locate a PAT entry that corresponds to the physical address. Examples of how a physical address is used to locate a PAT entry is described in FIGS. 3A and 3B and related text. At block 806, if the count control attribute (C-bit) is supported, the count control attribute of the entry is checked to see if accesses to the requested memory page should be counted. If the requested memory page is not to be counted, the method ends. On the other hand, if the requested memory page is to be counted, at block 806, the source control attribute (S-bit) is checked to see if access to the memory page should be counted for the source making the access request (e.g., CPU or device). If the answer is no, the method ends. If, however, the access to the memory page is to be counted for the requesting CPU or device, then the access count attribute in the entry is incremented at block 110. Next, at block 812, a determination is made on whether the incremented access count attribute is overflown or has exceeded a configurable threshold. If so, at block 814, the interrupt control attribute (I-bit) is checked to see if an interrupt or exception message should be generated to report the issue. If the I-bit is set, then at block 816, an interrupt or exception message is generated. The target to which the generated message should be sent may be stored in a register or a location in memory. A new target may be selected by updating the stored target information. Although method 800 includes checking the control attributes (C-bit, S-bit, and I-bits) at blocks 806, 108, and 814, respectively, some or all of these checks may be skipped if the corresponding control attribute is not implemented or supported.

Figure 9:
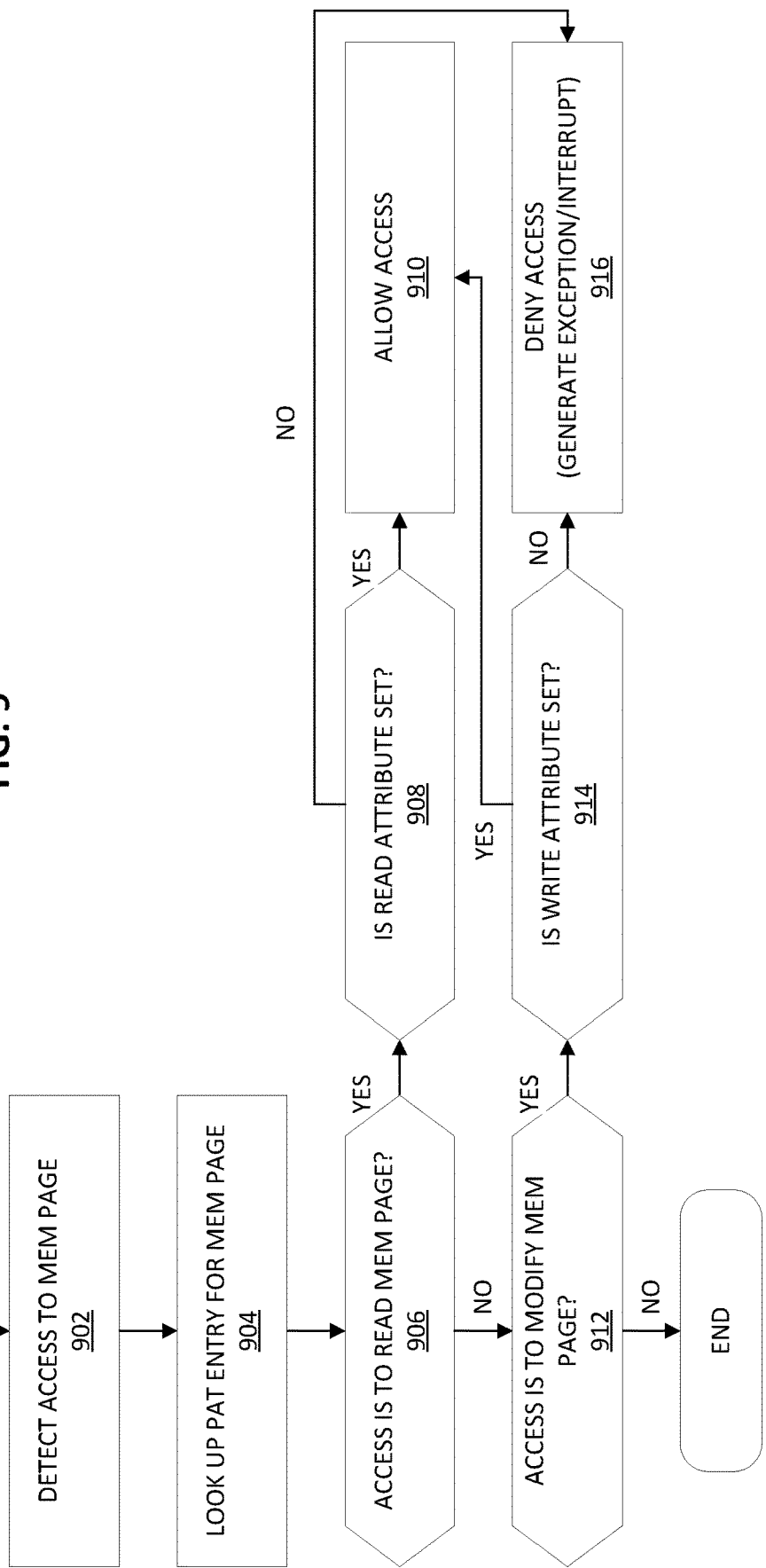
FIG. 9 is a flow diagram illustrating a method for enforcing access permission according to an embodiment.

FIG. 9 is a flow diagram that illustrates a method for enforcing access permission according to an embodiment. Method 900 may be implemented in any of the systems described in this disclosure. Specifically, method 900 may be performed by the PAT controllers 122 and 222 shown in FIGS. 1 and 2.

Method 900 begins at the start block and moves to block 902. At block 902, a request to access a memory page in memory is detected by a PAT controller. The PAT controller may monitor the connection between the CPU/device and the memory for memory requests. The request may contain one or more physical addresses to identify a requested memory page. At block 104, the physical address in the request is used to locate a PAT entry that corresponds to the physical address. If the access request is to read the memory page as determined at block 906, then at block 908, the read permission attribute (R-bit) is check at block 908. If the memory page may be read by the particular requestor, then at block 910, the read access is permitted. This may mean that the PAT controller simple does nothing. If, however, it is determined at block 908 that the requestor is not permitted to read the memory page, then at block 916, the read access is denied. According to an embodiment, this causes an interrupt or exception message to be generated. The target to which the generated message should be sent may be stored in a register or a location in memory.

Referring back to block 906, if the request was not to read the memory page, then at block 912, a determination is made on whether the request is to modify the memory page. At block 914, the write access attribute (W-bit) is checked at 914 if the request was indeed to write to the memory page. If the write access attribute indicates that the memory page may be modified by the requestor, then at block 910, the write access is permitted. Again, the permission may simply mean that no message is generated by the PAT controller. If, however, it is determined at block 908 that the requestor is not permitted to modify the memory page, then at block 916, the write access is denied. According to an embodiment, an interrupt or exception message, similar to that for a denied read access, is generated and sent to a target recipient.

Figure 10:
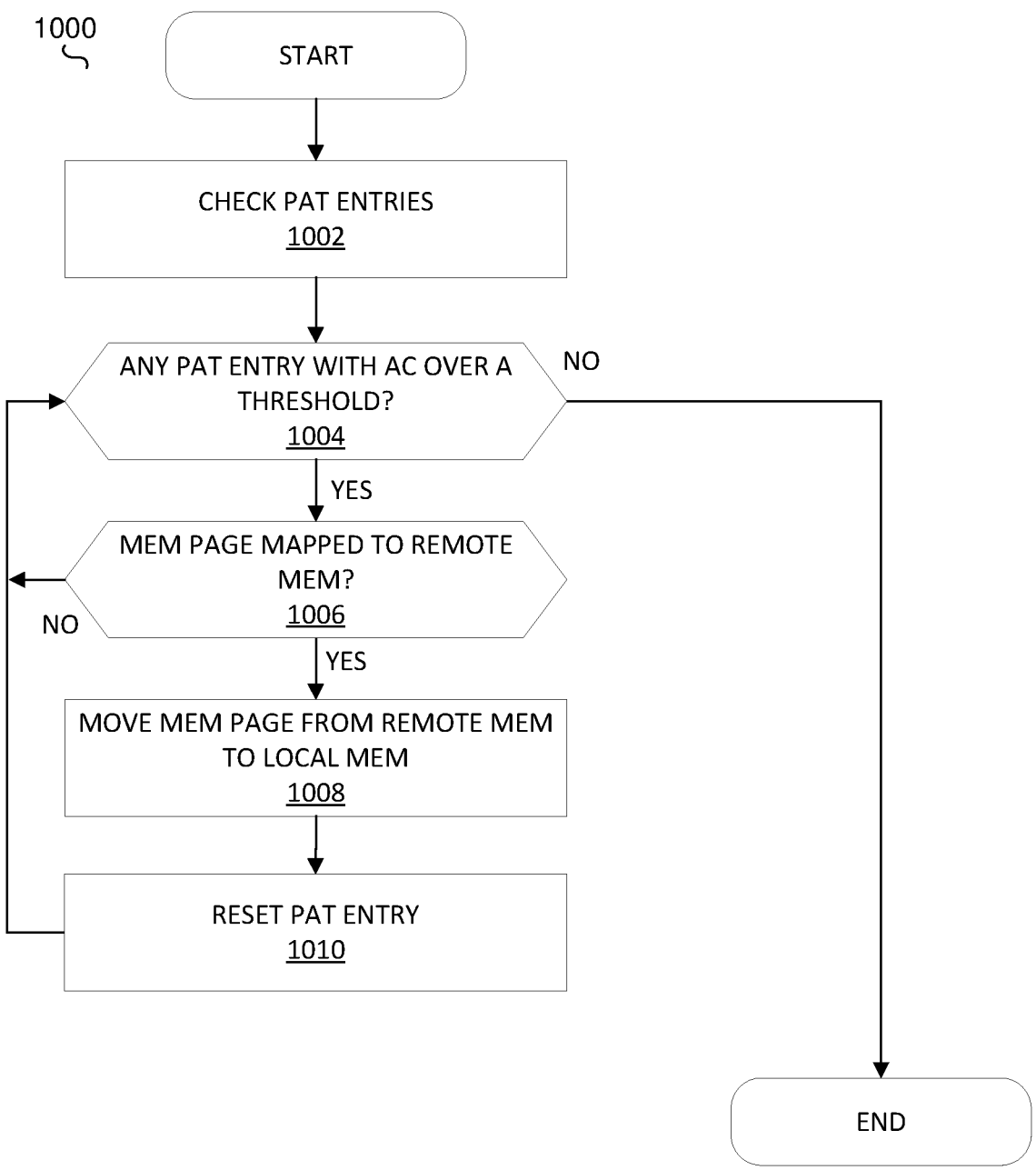
FIG. 10 is a flow diagram illustrating a method for managing memory page migration according to an embodiment.

FIG. 10 is a flow diagram illustrating a method for managing memory page migration according to an embodiment. Method 1000 may be implemented in any of the systems described in this disclosure. Specifically, method 1000 may be performed by software (e.g., operating system) executed on a CPU or a device. Alternatively, or in addition to, method 1000 may be performed by a CPU or device hardware.

Method 1000 begins at the start block and moves to block 1002. At block 1002, the entries in the PAT are checked. This may be accomplished by sequentially reading each of the entries in the PAT. At block 1004, the access count attribute of each entry is checked to see if any entry has its access count attribute exceeding a configurable threshold. If none of the entries has its access count exceeding the threshold, then at block 1012, the method ends. According to an embodiment, the method may be performed again after waiting a period of time. The amount of time to wait may also be configurable, such as through a control register. If, however, the access count of an entry is found to have exceeded a threshold, then at block 1006, a determination is made on whether the memory page corresponding to the entry is stored in a remote memory. If so, the memory page is moved from the remote memory to the local memory at block 1008. In a host-device system, the remote memory may be the device-attached memory and the remote memory is the host memory. Next, the attribute values, such as the access account attribute, in the PAT entry may be reset or reinitialized at block 1110.

Figure 11:
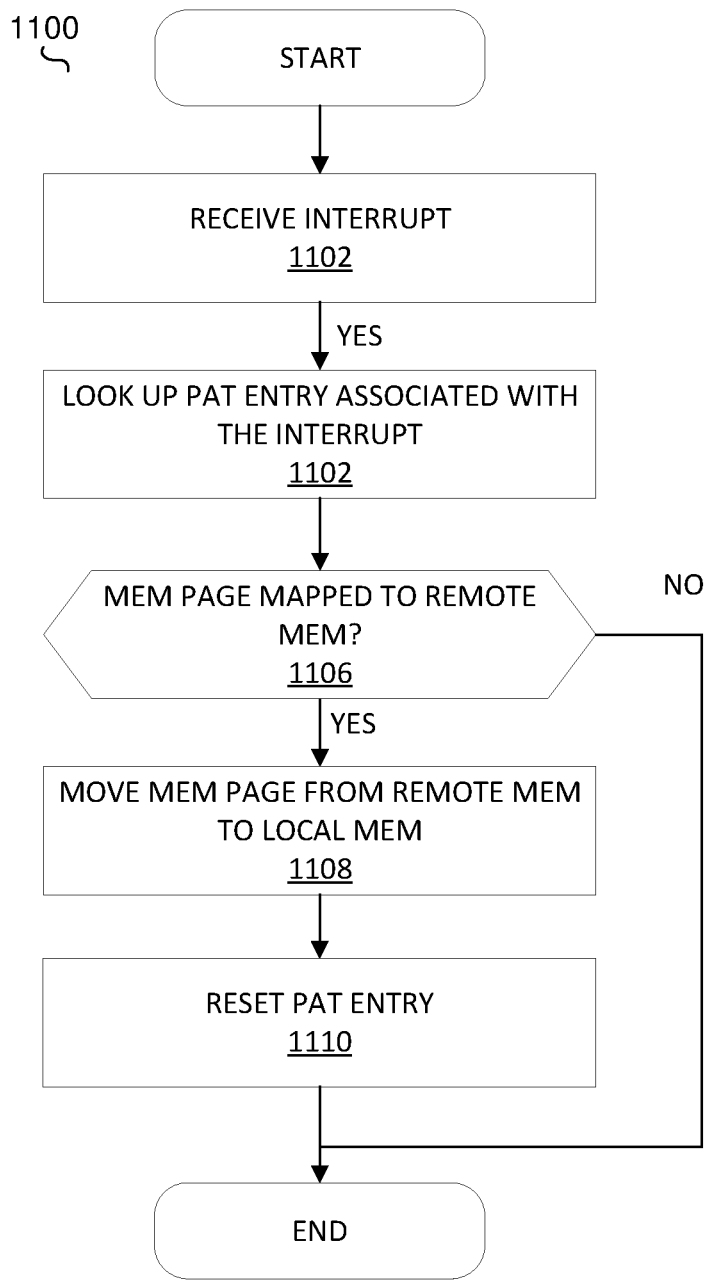
FIG. 11 is a flow diagram illustrating another method for managing memory page migration according to an embodiment.

FIG. 11 is a flow diagram illustrating another method for managing memory page migration according to an embodiment. Method 1100 may be implemented in any of the systems described in this disclosure. Specifically, method 1100 may be performed by software (e.g., operating system) executed on a CPU or a device. Alternatively, or in addition to, method 1100 may be performed by a CPU or device hardware.

Method 1100 begins at the start block and moves to block 1102. At block 1102, an interrupt or exception message is received. According to an embodiment, the message indicates that a PAT entry's access count attribute has exceeded a threshold or has an overflow. The message may contain a physical address to identify the PAT entry or such physical address may be stored in memory or registers in the PAT controller. At block 1104, the PAT entry identified by the message is looked up. At block 1106, a determination is made on whether the memory page corresponding to the PAT entry is stored in a remote memory. If so, the memory page is moved from the remote memory to the local memory at block 1108. In a host-device system, the remote memory may be the device-attached memory and the remote memory is the host memory. Next, the attribute values, such as the access account attribute, in the PAT entry may be reset or reinitialized at block 1110.

An example of the present invention is a system that includes a processing unit, a system memory accessible by the processing unit, a physical attribute table (PAT), and software executed on the processing unit. The system memory includes at least a local memory and a remote memory to which multiple memory pages are mapped. Local memory refers to physical memory located in a same socket as the processing unit and remote memory refers to physical memory located in a different socket as the processing unit. Each of the memory pages corresponds to one or more physical addresses in a physical memory address space and can be accessed by the processing unit. The PAT store a set of attributes for each of the memory pages. It includes a plurality of entries each of which corresponds to a memory pages and stores the set of attributes for that memory page. Software executed on the processing unit controls movement of the memory pages between the local memory and the remote memory based on attributes stored in the PAT. For example, upon detecting that a memory page in the remote memory is being accessed frequently by the processing unit based on the set of attributes associated with that page in the PAT, software is to cause that memory page to be moved from the remote memory to the local memory.

The set of attributes in the PAT may include an access count attribute (e.g., a saturating counter) to track a number of accesses to the memory page corresponding to the entry, a count control attribute to indicate whether the accesses to the memory page corresponding to the entry should be tracked by the access count attribute, a source control attribute to indicate whether the accesses to the memory page corresponding to the entry by a particular accessor should be tracked by the access count attribute, an Interrupt (I) attribute to indicate whether an interrupt should be generated when the access count attribute for the entry exceeds a threshold, a read access attribute to indicate whether the memory page corresponding to the entry may be read by the processing unit, a write access attribute to indicate whether the memory page corresponding to the entry may be modified by the processing unit, and/or a dirty attribute to indicate whether the physical address/memory page corresponding to the entry have been modified.

The system may further include a memory management unit to provide virtual-to-physical address translation for the processing unit. The PAT may be stored in the system memory or in other dedicated storage unit. Entries of the PAT may be cached in a cache. The cached entries are accessible by a PAT controller which manages operations of the PAT. The PAT may be implemented as a flat table or as a hierarchical table that includes two or more levels.

Another example of the present invention is a method that includes: implementing a system memory that is accessible by a processing unit and includes a local memory and a remote memory, each of the local and remote memory having mapped thereon multiple of memory pages each corresponding to one or more physical addresses of a physical address space; storing, in a physical attribute table (PAT), a set of attributes for each of the memory pages where each of the entries of the PAT corresponds to one of the memory pages and stores the set of attributes for that memory page; and controlling, by software executed on the processing unit, movement of the memory pages between the local memory and the remote memory based on the attributes stored in the PAT. The method may further include detecting a particular memory page, which is mapped to the remote memory, is being frequent accessed by the processing unit based on the set of attributes corresponding to that memory page in the PAT, and causing that memory page to be moved from the remote memory to the local memory. The method may further include tracking a number of accesses to a particular memory page using an access count attribute (e.g., a saturating counter) in the set of attributes corresponding to that memory page; determining whether accesses to the memory page should be tracked by the access count attribute based on a count control attribute corresponding to the memory page, determining whether accesses to the memory page by a particular accessor should be tracked by the access count attribute based on a source control attribute corresponding to the memory page; determining whether an interrupt should be generated when the access count attribute for the entry exceeds a threshold, based on an interrupt control attribute corresponding to the memory page; determining whether the memory page may be read by the processing unit based on a read access attribute corresponding to the memory page; determining whether the memory page may be modified by the processing unit based on a write access attribute corresponding to the memory page; and/or determining whether the memory page has been modified based on a dirty attribute corresponding to the memory page. The method may further include implementing a memory management unit to provide virtual-to-physical address translation for the processing unit. Furthermore, the method may include implementing the PAT as a flat table or as a hierarchical table that includes two or more levels; storing the PAT in the system memory or in a dedicated storage unit; caching the PAT entries in a cache; and/or accessing the cached entries by a PAT controller that manages operations of the PAT. The local memory referred to herein may be a physical memory located in a same socket as the processing unit while the remote memory may be a physical memory located in a different socket. If the processing unit is a device that is attached to a host, then the local memory may be device memory and the remote memory may be the host memory.

Figure 12:
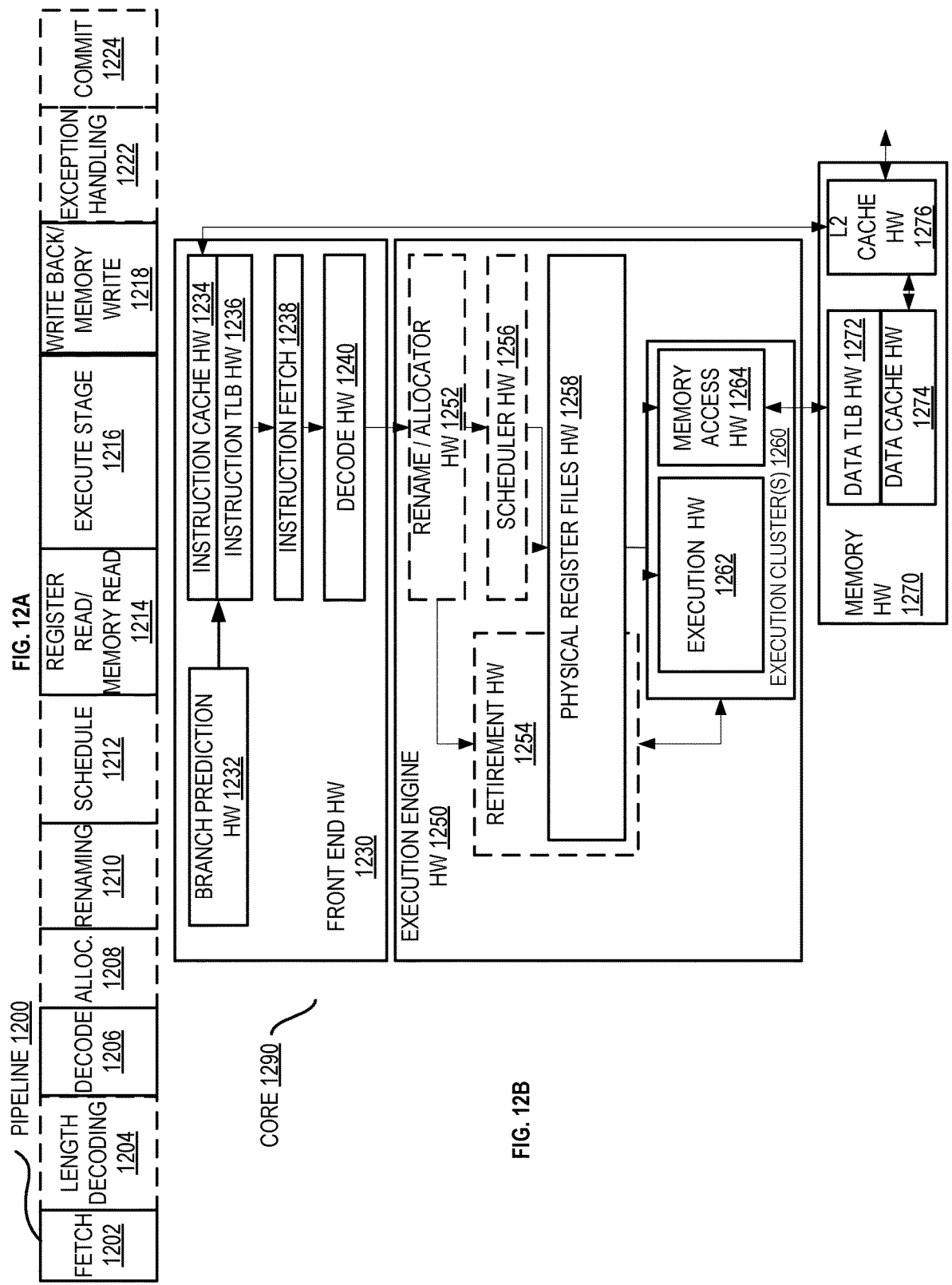
FIG. 12A is a block diagram illustrating both an exemplary in-order pipeline and an exemplary register renaming, out-of-order issue/execution pipeline according to embodiments of the invention.
FIG. 12B is a block diagram illustrating both an exemplary embodiment of an in-order architecture core and an exemplary register renaming, out-of-order issue/execution architecture core to be included in a processor according to embodiments of the invention.

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end hardware 1230 coupled to an execution engine hardware 1250, and both are coupled to a memory hardware 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end hardware 1230 includes a branch prediction hardware 1232 coupled to an instruction cache hardware 1234, which is coupled to an instruction translation lookaside buffer (TLB) 1236, which is coupled to an instruction fetch hardware 1238, which is coupled to a decode hardware 1240. The decode hardware 1240 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode hardware 1240 or otherwise within the front end hardware 1230). The decode hardware 1240 is coupled to a rename/allocator hardware 1252 in the execution engine hardware 1250.

The execution engine hardware 1250 includes the rename/allocator hardware 1252 coupled to a retirement hardware 1254 and a set of one or more scheduler hardware 1256. The scheduler hardware 1256 represents any number of different schedulers, including reservations stations, central instruction window, etc. The scheduler hardware 1256 is coupled to the physical register file(s) hardware 1258. Each of the physical register file(s) hardware 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1258 comprises a vector registers hardware, a write mask registers hardware, and a scalar registers hardware. This register hardware may provide architectural vector registers, vector mask registers, and general purpose registers. The physical register file(s) hardware 1258 is overlapped by the retirement hardware 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1254 and the physical register file(s) hardware 1258 are coupled to the execution cluster(s) 1260. The execution cluster(s) 1260 includes a set of one or more execution hardware 1262 and a set of one or more memory access hardware 1264. The execution hardware 1262 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1256, physical register file(s) hardware 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1264). It should also be understood that where separate pipelines are used, one or more of these pipelines may be out-of-order issue/execution and the rest in-order.

The set of memory access hardware 1264 is coupled to the memory hardware 1270, which includes a data TLB hardware 1272 coupled to a data cache hardware 1274 coupled to a level 2 (L2) cache hardware 1276. In one exemplary embodiment, the memory access hardware 1264 may include a load hardware, a store address hardware, and a store data hardware, each of which is coupled to the data TLB hardware 1272 in the memory hardware 1270. The instruction cache hardware 1234 is further coupled to a level 2 (L2) cache hardware 1276 in the memory hardware 1270. The L2 cache hardware 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode hardware 1240 performs the decode stage 1206; 3) the rename/allocator hardware 1252 performs the allocation stage 1208 and renaming stage 1210; 4) the scheduler hardware 1256 performs the schedule stage 1212; 5) the physical register file(s) hardware 1258 and the memory hardware 1270 perform the register read/memory read stage 1214; the execution cluster 1260 perform the execute stage 1216; 6) the memory hardware 1270 and the physical register file(s) hardware 1258 perform the write back/memory write stage 1218; 7) various hardware may be involved in the exception handling stage 1222; and 8) the retirement hardware 1254 and the physical register file(s) hardware 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1234/1274 and a shared L2 cache hardware 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 13:
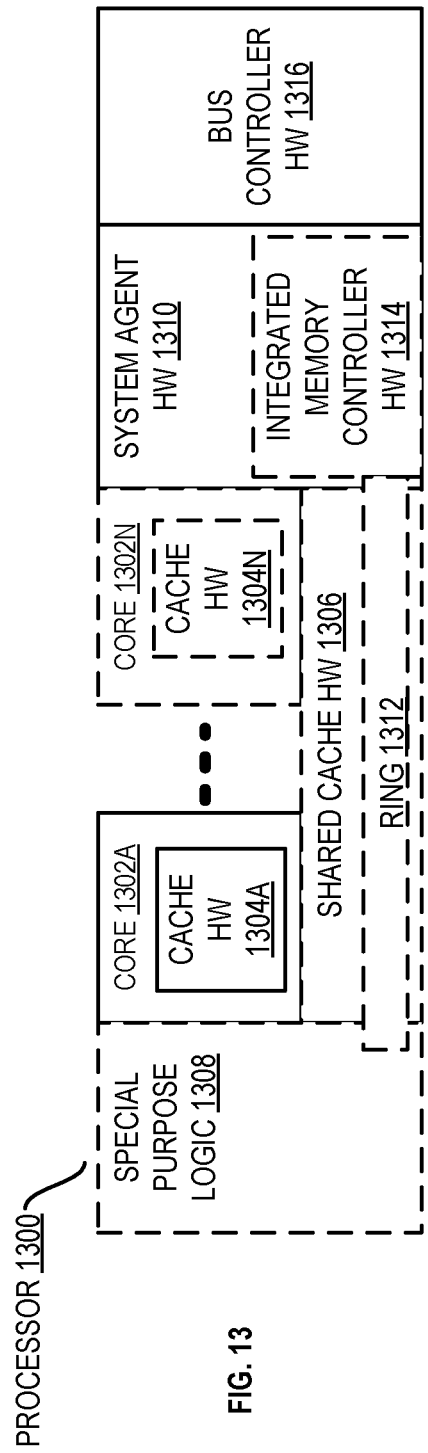
FIG. 13 is a block diagram of a single core processor and a multicore processor with integrated memory controller and graphics according to embodiments of the invention.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller hardware 1316, while the optional addition of the dashed lined boxes illustrates an alternative processor 1300 with multiple cores 1302A-N, a set of one or more integrated memory controller hardware 1314 in the system agent hardware 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1306, and external memory (not shown) coupled to the set of integrated memory controller hardware 1314. The set of shared cache hardware 1306 may include one or more mid-level caches, such as level 2 (L2), level 3 (L3), level 4 (L4), or other levels of cache, a last level cache (LLC), and/or combinations thereof. While in one embodiment a ring based interconnect hardware 1312 interconnects the integrated graphics logic 1308, the set of shared cache hardware 1306, and the system agent hardware 1310/integrated memory controller hardware 1314, alternative embodiments may use any number of well-known techniques for interconnecting such hardware. In one embodiment, coherency is maintained between one or more cache hardware 1306 and cores 1302-A-N.

In some embodiments, one or more of the cores 1302A-N are capable of multithreading. The system agent 1310 includes those components coordinating and operating cores 1302A-N. The system agent hardware 1310 may include for example a power control unit (PCU) and a display hardware. The PCU may be or include logic and components needed for regulating the power state of the cores 1302A-N and the integrated graphics logic 1308. The display hardware is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set. In one embodiment, the cores 1302A-N are heterogeneous and include both the "small" cores and "big" cores described below.

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
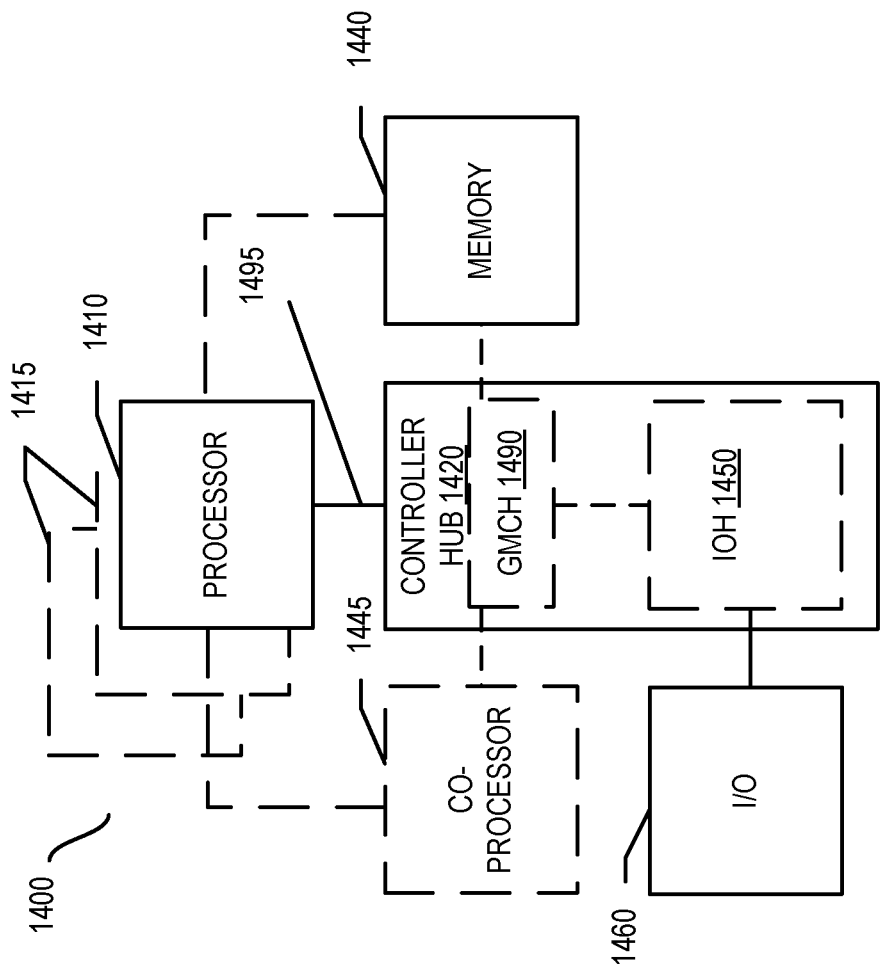
FIG. 14 illustrates a block diagram of a system in accordance with one embodiment of the present invention.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface, or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
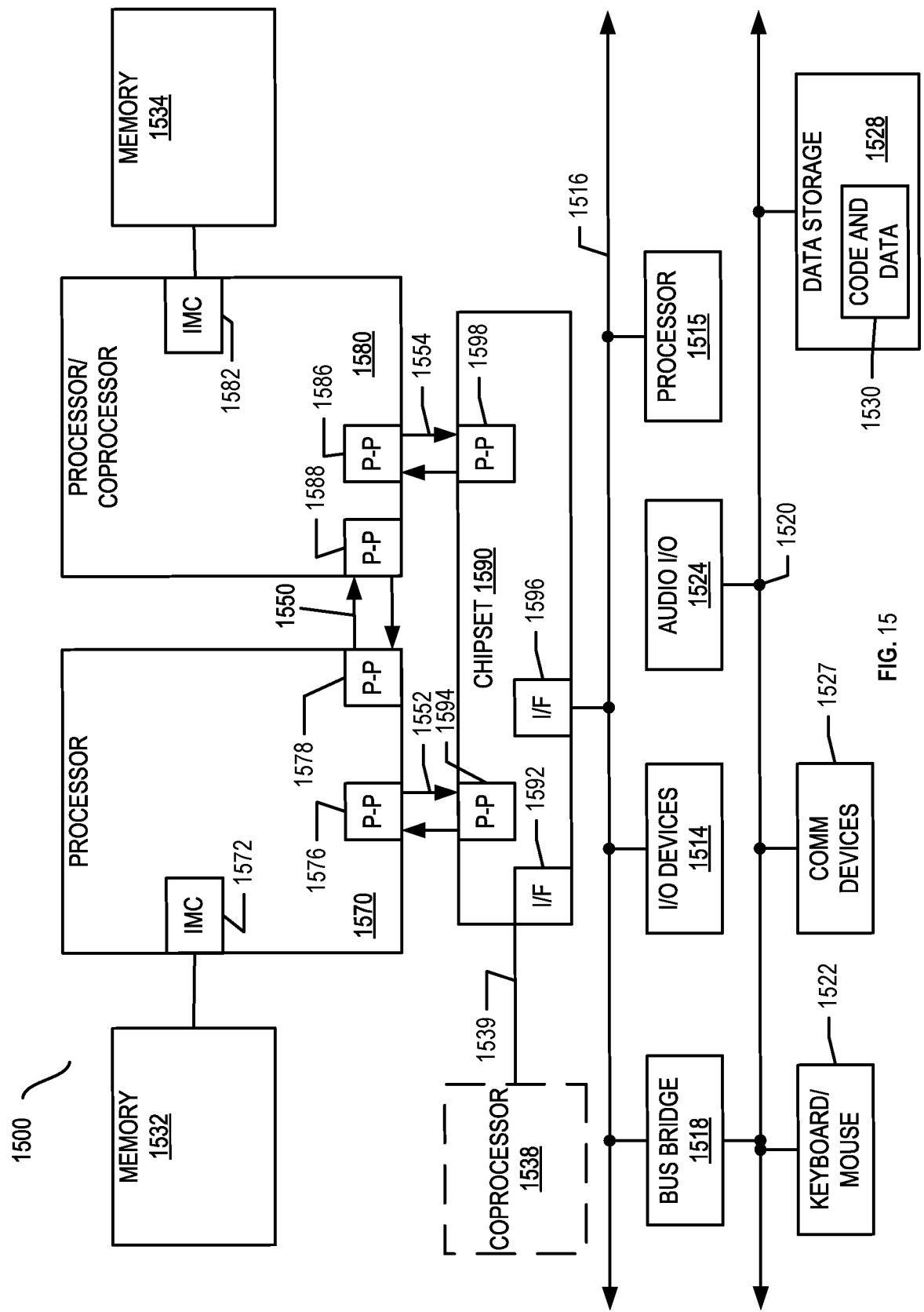
FIG. 15 illustrates a block diagram of a second system in accordance with an embodiment of the present invention.

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) hardware 1572 and 1582, respectively. Processor 1570 also includes as part of its bus controller hardware point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) hardware), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage hardware 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
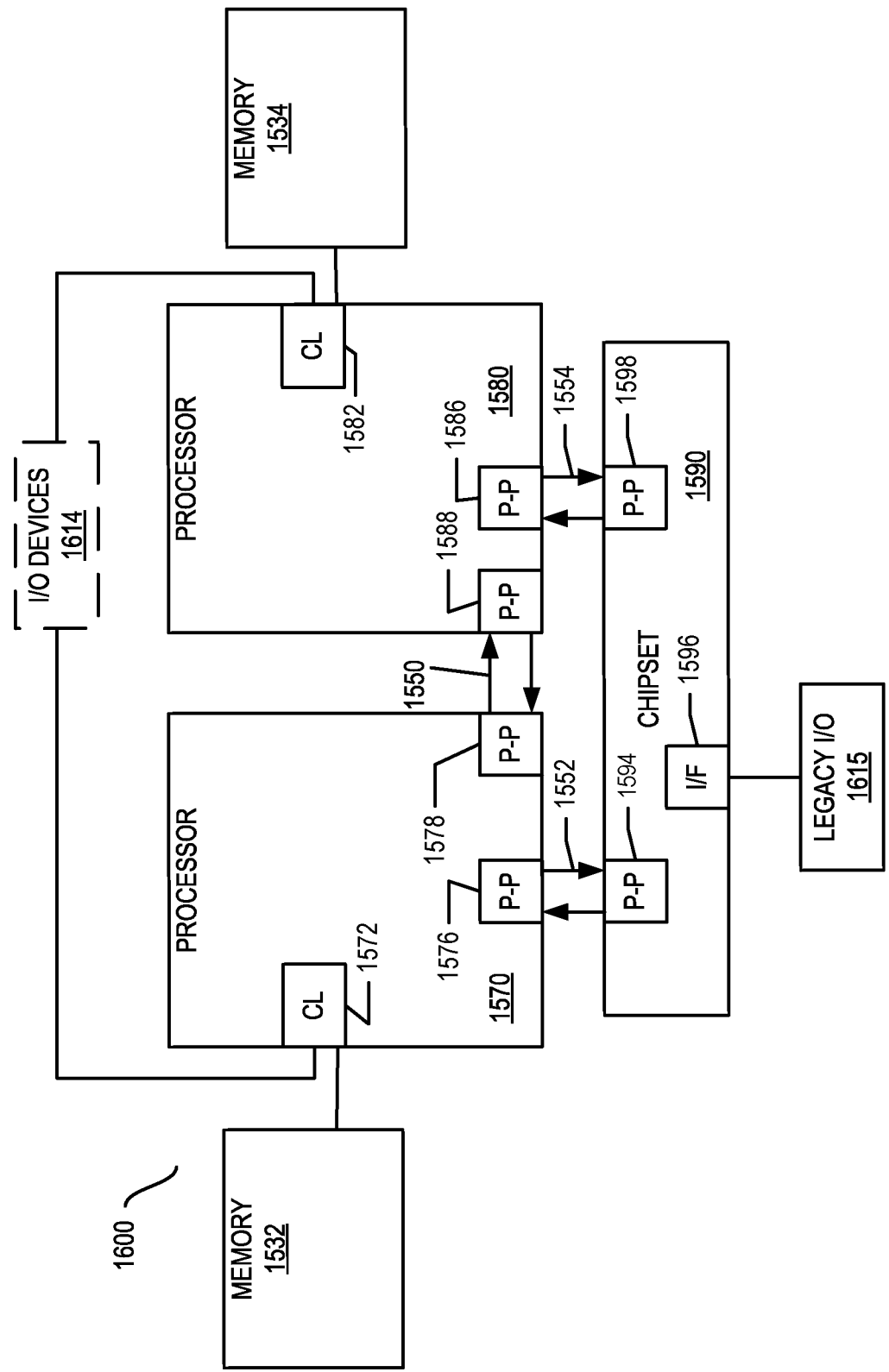
FIG. 16 illustrates a block diagram of a third system in accordance with an embodiment of the present invention.

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller hardware and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
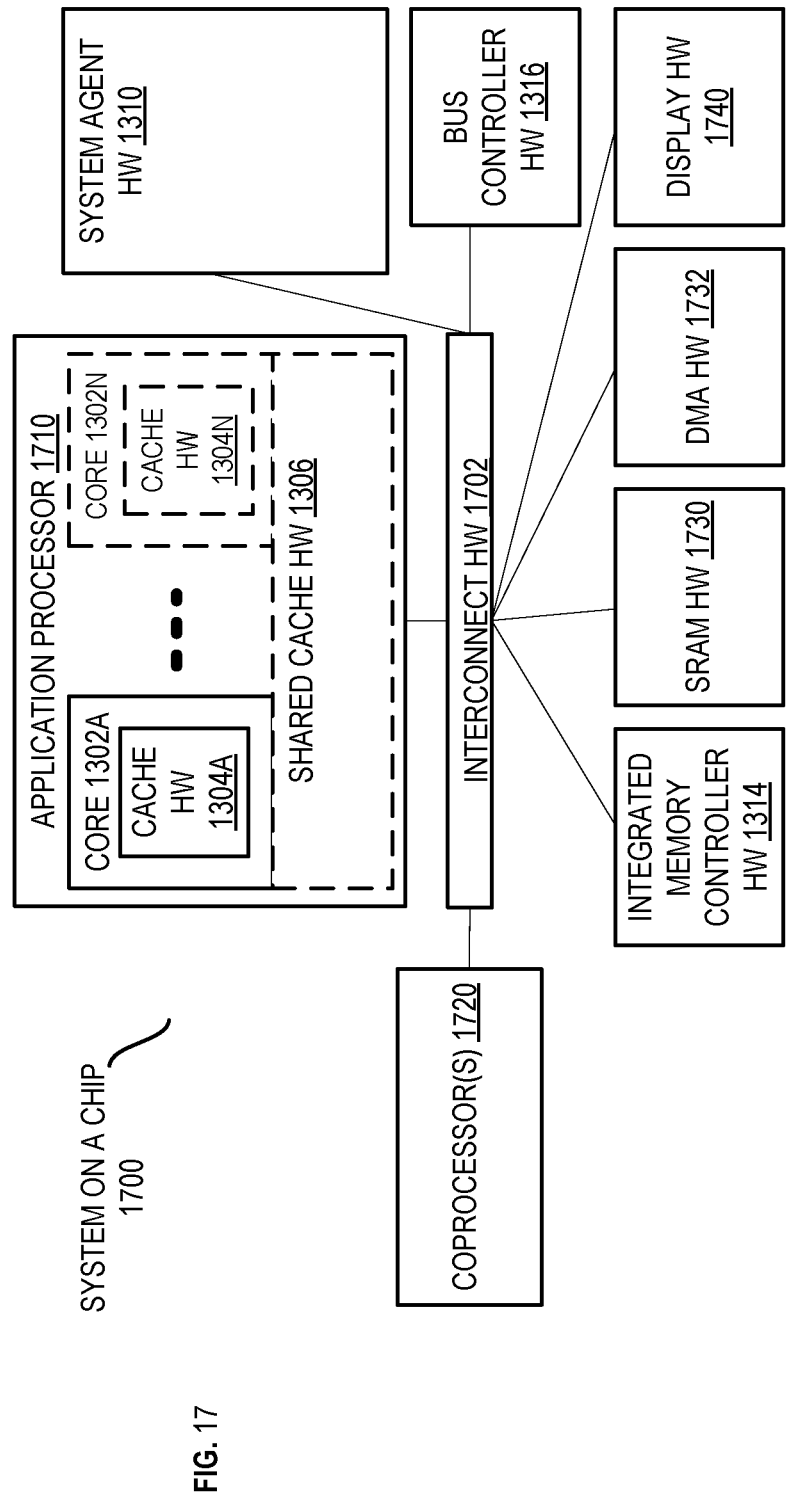
FIG. 17 illustrates a block diagram of a system on a chip (SoC) in accordance with an embodiment of the present invention.

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect hardware 1702 is coupled to: an application processor 1710 which includes a set of one or more cores 1302A-N and shared cache hardware 1306; a system agent hardware 1310; a bus controller hardware 1316; an integrated memory controller hardware 1314; a set or one or more coprocessors 1720 which may include integrated graphics logic, an image processor, an audio processor, and a video processor; an static random access memory (SRAM) hardware 1730; a direct memory access (DMA) hardware 1732; and a display hardware 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
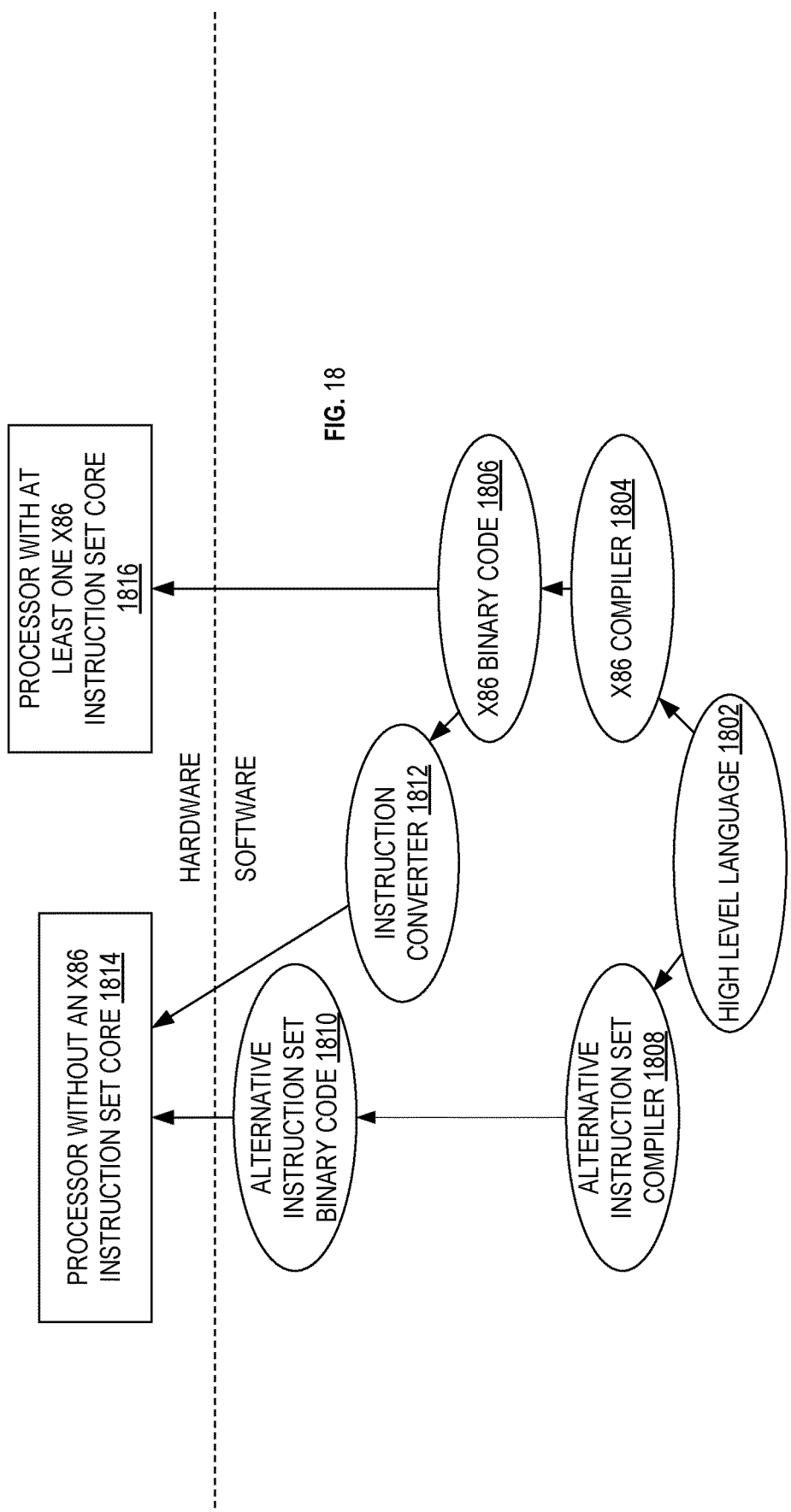
FIG. 18 illustrates a block diagram contrasting the use of a software instruction converter to convert binary instructions in a source instruction set to binary instructions in a target instruction set according to embodiments of the invention.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

The invention claimed is:

1. A system comprising:
a system memory to comprise a local memory and a remote memory, the local and remote memory to have mapped thereon, a plurality of memory pages, each of the plurality of memory pages to correspond to one or more physical addresses;
a physical attribute table (PAT) to store a plurality of entries, each entry corresponding to one of the plurality of memory pages and stores a set of attributes for the corresponding memory page, the set of attributes including an access count attribute that tracks a number of accesses to the corresponding memory page, a count control attribute that indicates accesses to the corresponding memory page is tracked by the access count attribute when the count control attribute is of a first control value and not tracked by the access count attribute when the count control attribute is of a second control value, and a source control attribute that specifies a source of the accesses tracked by the access count attribute, wherein the access count attribute is to track only accesses made by a first accessor when the source control attribute is of a first value, to track only accesses made by a second accessor when the source control attribute is of a second value, and to track accesses made by either of the first or the second accessors when the source control attribute is of a third value; and
a processing unit to access the memory pages stored in the system memory and to control movement of the memory pages between the local memory and the remote memory based on the attributes stored in the PAT, wherein upon a detection of frequent accesses to a first memory page mapped to the remote memory based on the set of attributes of the first memory page in the PAT, the first memory page is to be moved from the remote memory to the local memory.

2. The system of claim 1, wherein the local memory is located in a same socket as the processing unit and the remote memory is located in a different socket as the processing unit.

3. The system of claim 1, wherein the set of attributes further includes an Interrupt (I) attribute to indicate whether an interrupt should be generated when the access count attribute for the entry exceeds a threshold.

4. The system of claim 1, wherein the set of attributes includes a read access attribute to indicate whether the memory page corresponding to the entry may be read by the processing unit.

5. The system of claim 1, wherein the set of attributes includes a write access attribute to indicate whether the memory page corresponding to the entry may be modified by the processing unit.

6. The system of claim 1, wherein the set of attributes includes a dirty attribute to indicate whether the memory page corresponding to the entry have been modified.

7. The system of claim 1, wherein one or more entries of the PAT is cached in a cache accessible by a PAT controller which manages operations of the PAT.

8. The system of claim 1, wherein the first accessor is the processing unit and the second accessor is an attached device.

9. The system of claim 1, further comprising a register to store a root memory address for identifying a location in system memory in which the PAT is stored.

10. The system of claim 1, wherein the access count attribute can be configured, based on other attributes within the PAT, to track accesses to the corresponding memory page made by one of: a particular processor, any processor within a particular socket, and all processors within a computing system.

11. A method comprising:
storing, in a physical attribute table (PAT), a set of attributes for each of a plurality of memory pages stored in a local memory or a remote memory of a system memory, the PAT including a plurality of entries, each entry corresponding to one of the plurality of memory pages and stores the set of attributes for the corresponding memory page;
tracking a number of accesses to a first memory page using an access count attribute of the set of attributes in the entry corresponding to the first memory page responsive to determining, based on a count control attribute in the set of attributes corresponding to the first memory page, that accesses to the first memory page is to be tracked, wherein accesses to the first memory page is to be tracked when the count control attribute is of a first value and not to be tracked when the count control attribute is of a second value;
specifying the accesses to be tracked by the access count attribute using on a source control attribute, wherein the access count attribute is to track only accesses made by a first accessor when the source control attribute is of a first value, to track only accesses made by a second accessor when the source control attribute is of a second value, and to track accesses made by either of the first or the second accessors when the source control attribute is of a third value;
controlling movement of the memory pages between the local memory and the remote memory based on the attributes stored in the PAT, the controlling further comprises:
detecting frequent accesses by a processing unit to a first memory page stored in the remote memory based on the set of attributes of the first memory page in the PAT; and
causing the first memory page to be moved from the remote memory to the local memory.

12. The method of claim 11, wherein the local memory is located in a same socket as the processing unit and the remote memory is located in a different socket as the processing unit.

13. The method of claim 11, further comprising determining whether an interrupt should be generated when the access count attribute for the entry exceeds a threshold, based on an interrupt control attribute in the set of attributes corresponding to the memory page.

14. The method of claim 11, further comprising determining whether the memory page may be read by the processing unit based on a read access attribute in the set of attributes corresponding to the memory page.

15. The method of claim 11, further comprising determining whether the memory page may be modified by the processing unit based on a write access attribute in the set of attributes corresponding to the memory page.

16. The method of claim 11, further comprising determining whether the memory page has been modified based on a dirty attribute in the set of attributes corresponding to the memory page.

17. The method of claim 11, further comprising caching one or more entries of the PAT in a cache accessible by a PAT controller which manages operations of the PAT.

18. The method of claim 11, wherein the first accessor is the processing unit and the second accessor is an attached device, and wherein the method further comprises storing, in a register, a root memory address for identifying a location in system memory in which the PAT is stored.

* * * * *